US006970509B2

(12) United States Patent
Xiang et al.

(10) Patent No.: US 6,970,509 B2
(45) Date of Patent: Nov. 29, 2005

(54) CELL ARRAY AND METHOD OF MULTIRESOLUTION MOTION ESTIMATION AND COMPENSATION

(75) Inventors: Shuhua Xiang, Fremont, CA (US); Li Sha, San Jose, CA (US); Yaojun Luo, San Jose, CA (US)

(73) Assignee: WIS Technologies, Inc., Santa Clara, CA (US)

( * ) Notice: Subject to any disclaimer, the term of this patent is extended or adjusted under 35 U.S.C. 154(b) by 619 days.

(21) Appl. No.: 09/924,079

(22) Filed: Aug. 7, 2001

(65) Prior Publication Data

US 2005/0213661 A1    Sep. 29, 2005

(51) Int. Cl.$^7$ .............................................. H04N 7/18
(52) U.S. Cl. .............................. 375/240.16; 375/240.17
(58) Field of Search ...................... 375/240.11–240.29; 348/710–725

(56) References Cited

U.S. PATENT DOCUMENTS

| | | | |
|---|---|---|---|
| 5,228,130 A | 7/1993 | Michael | |
| 5,299,144 A | 3/1994 | Bartkowiak et al. | |
| 5,361,220 A | 11/1994 | Asano | |
| 5,398,078 A | * 3/1995 | Masuda et al. | 348/699 |
| 5,633,897 A | 5/1997 | Fettweis et al. | |
| 5,694,127 A | 12/1997 | Tayama | |
| 5,706,001 A | 1/1998 | Sohn | |
| 5,706,002 A | 1/1998 | Meehan et al. | |
| 5,799,201 A | 8/1998 | Lorenz et al. | |
| 5,835,145 A | 11/1998 | Ouyang et al. | |
| 5,941,940 A | 8/1999 | Prasad et al. | |
| 6,038,675 A | 3/2000 | Gabzdyl et al. | |
| RE37,048 E | 2/2001 | McCollum | |
| 6,209,017 B1 | 3/2001 | Lim et al. | |
| 6,243,734 B1 | 6/2001 | Doshi et al. | |
| 6,407,680 B1 | 6/2002 | Lai et al. | |
| 6,421,695 B1 | 7/2002 | Bae et al. | |
| 6,463,445 B1 | 10/2002 | Suzuki et al. | |
| 6,507,293 B2 | 1/2003 | Deeley et al. | |

(Continued)

*Primary Examiner*—Andy Rao
(74) *Attorney, Agent, or Firm*—Fenwick & West LLP

(57) ABSTRACT

A method, apparatus, computer medium, and other embodiments for motion estimation and compensation processing of video and image signals are described. Within a sequence of frames, block-based differences are taken between frames to exploit redundancies between pictures by taking a matchblock from the current picture and by determining a spatial offset in a corresponding reference picture which signifies a good prediction of where the current macroblock can be found. Multi-level motion estimation is performed in three stages to refine the resolution of the motion vector with reduced computational bandwidth. First, a matchblock from a reference frame is decomposed equally into several sub-matchblocks, each of which is searched in parallel over a search area decomposed into sub-blocks by a similar factor so as to determine a preliminary motion vector in the reference picture. Second, a full size matchblock is then searched over a refined search area using the preliminary motion vector to determine an intermediate motion vector, so as to refine the resolution of the preliminary motion vector. Third, fractional-pixel searching is then performed on the matchblock and the intermediate motion vector to determine a final motion vector having an even higher resolution associated with the best motion vector to be used in predicting the current macroblock. In one embodiment, a processor-based motion estimation and compensation cell array enables contemporaneous and independent loading and processing operations in parallel.

46 Claims, 13 Drawing Sheets

U.S. PATENT DOCUMENTS

| | | | |
|---|---|---|---|
| 6,516,031 B1 * | 2/2003 | Ishihara et al. | 375/240.16 |
| 6,523,071 B1 | 2/2003 | Klinger et al. | |
| 6,552,673 B2 | 4/2003 | Webb | |
| 6,587,057 B2 | 7/2003 | Scheuermann | |
| 6,593,860 B2 | 7/2003 | Lai et al. | |
| 6,647,061 B1 | 11/2003 | Panusopone et al. | |
| 6,701,405 B1 | 3/2004 | Adusumilli et al. | |
| 6,728,862 B1 * | 4/2004 | Wilson | 712/14 |
| 2001/0016884 A1 | 8/2001 | Sato et al. | |
| 2002/0199040 A1 | 12/2002 | Irwin et al. | |
| 2003/0014457 A1 | 1/2003 | Desai et al. | |

* cited by examiner

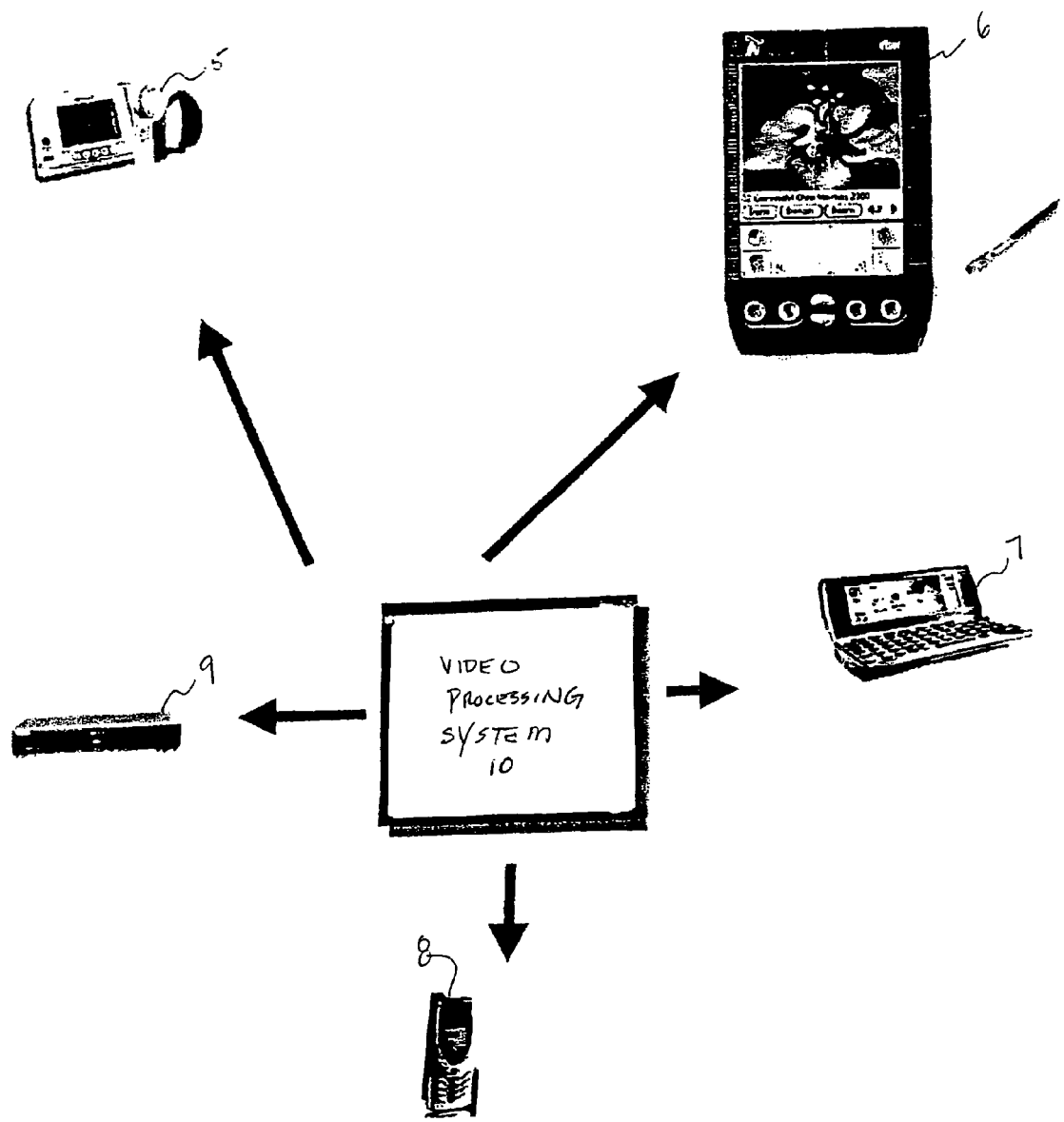
FIG. 1.B

CELL ARRAY AND METHOD OF MULTIRESOLUTION MOTION ESTIMATION AND COMPENSATION

CROSS-REFERENCE TO RELATED APPLICATION

This application claims priority under 35 U.S.C. § 119(e) to U.S. Provisional Patent Application No. 60/309,239, entitled "Video Processing System with Flexible Video Format," filed Jul. 31, 2001, the subject matter of which is incorporated by reference in its entirety herein now abandoned.

TECHNICAL FIELD

The present invention relates generally to video processing, and in particular to a video encoding compression scheme used with motion estimation and compensation.

BACKGROUND OF THE INVENTION

Conventional video compression algorithms utilize the temporal correlation amongst frames of pictures to remove redundancy there between. For example, a previous (reference) a frame is used to predict a current frame to be encoded. The prediction operation must account for the motion of objects in a frame in order to enable motion compensation, whereby a matchblock is taken from a current frame and a spatial offset in the reference frame is determined to represent a good prediction of where the matchblock of the current frame can be found. This offset is known as the motion vector. To determine the spatial offset, some form of difference is taken between a search area of the reference frame and a matchblock of the current frame to generate the prediction data.

In general, motion compensation involves the use of the motion vector to extract the predicting block from the reference frame, to subtract it therefrom, and to use the resulting difference for further compression. Motion estimation involves ascertaining the best motion vector to be used in predicting the matchblock from the current frame. In the typical model used for motion estimation, an assumption is made that the image in the current frame is a translation of the image in the reference frame. It can be also assumed that there is virtually no change in the image content amongst frames, or that such a change will be compensated by known techniques not specifically discussed herein. Because the image of the current frame is a translation of the image of the reference frame, a block of pixels in the current frame must reside somewhere within a searchable area in the reference frame.

One problem associated with motion estimation is that it is an expensive computing activity in the encoding process, i.e., typically associated with calculation intensive steps. For example, in FIG. 9, for each match, exhaustively searching a (64×64 pixels) search area 222 for a (16×16 pixels) matchblock 220, involves undertaking: 256 comparisons (differences); 256 calculations involving computing the absolute values of the differences (referenced subsequently as "absolute value calculations" for convenience and brevity) between the matchblock and a search area; and 255 additions of the 256 values. For 64 matches, the total computations involved increases drastically to 64·64·256+64·64·256+64·64+255. Because motion estimation conventionally requires an exhaustive search of a large area of the matchblock, it can thus be appreciated that a need exists for a technique to reduce the number of computations required to determine the motion vector information. It is desirable to reduce the large number of calculations traditionally involved to determine the motion vector.

In the past, approaches aimed at reducing the large number of calculations associated with motion estimation have generally proven unsatisfactory because of the degradation in resolution quality. For example, to reduce the large number of calculations, one conventional approach increases the size of the matchblock. This increases the computations per comparison; A however, there will be fewer blocks per frame, which leads to a lower number of times motion compensation is undertaken. While this approach results in fewer blocks per frame, it is problematic because it can lead to poor predictions, especially when the probability that a block will contain objects moving in different directions increases with size. Another approach attempts to reduce the search area size in order to reduce the number of computations to search for a match. Yet, this approach has a drawback of missing the match because the search area is small. Accordingly, what is needed is a way to reduce the number of motion estimation calculations while keeping a high quality of the resulting predictions. It is desirable if the motion estimation calculations could improve the resolution quality of the resulting predictions.

When the video compression techniques and associated hardware are applied in the field of portable multimedia devices, other considerations arise. To be practical and cost-effective, the architecture hardware must not only be able to handle a large amount of data traffic as a result of the intensive calculations associated with video processing, but also be compact and uncomplicated. The large amount of data traffic is a result of loading video images from storage to a processor, and returning the processed images back to storage, only to load more video images. Conventional approaches use a 128 bit bus to handle the large amount of data traffic, however, this data bandwidth is too large for the minimal placement and routing requirements of VLSI, ASIC and System-on-Chip (SoC) applications being used in increasing smaller and more streamlined multimedia-based devices and appliances. As many hand-held portable devices equipped to handle multimedia video formats continue to become increasingly smaller in size, it would be ideal if the video compression hardware were streamlined, that is, with logic designed so that the routing, placement, and layout of logic and circuit components are compact, have an uncomplicated design, and yet are enabled to accommodate complex calculations.

SUMMARY OF DESCRIBED EMBODIMENTS

The present invention overcomes the deficiencies and limitations of the prior art by providing a system for video compression of frames of pictures (images). According to one aspect of the present invention, a novel system for performing motion estimation and compensation is provided. In order to determine the motion vectors used in motion estimation, one embodiment of the system includes a base platform (back end) having a processor, bus and interrupt controller, memory device, memory controller, and multi-channel controller coupled to a system bus. Digitized video signals originating from a source are received by an audio/visual input interface which is coupled to the system bus. In the embodiment described, the system further includes a front end having a discrete cosine transformer capable of functioning also as an inverse discrete cosine transformer, quantizer capable of functioning as an inverse quantizer, a variable length coding encoder, macroblock SRAM, a stream buffer, one or more block SRAMs generally functioning as buffer memories, and a motion estimation and compensation (MEC) engine.

The MEC engine includes a two-dimensional processor array (referred to as the MEC cell array) comprising a sub-array of p_cells communicatively coupled to boundary cells. The boundary cells include io cells, updown cells, and column cells. In one aspect in accordance with the present invention, the MEC cell array is configured with a Multiple Input stream Multiple Data stream (MIMD) arrangement of control signal lines, and is operated by a column controller, and two integrated circuit (IC) controllers, namely an x-instruction controller and a y-instruction controller which control the operation of the two dimensional processor array. The column controller is the last processor which decides the optimal motion vector to output.

One benefit of using the MIMD arrangement is the multiple processing functions enabled in the cell array, wherein each cell is capable of processing its own set of instructions simultaneously and independently. With the MIMD arrangement, the MEC cell array is enabled to perform video processing, thereby allowing the system (back end) processor to provide the control and coordination of blocks of data.

Another aspect in accordance with the present invention includes the MEC cell array being configured with a Single Input stream Multiple Data stream (SIMD) arrangement of control signal lines operated by the system (back end) processor.

According to a further aspect of the present invention, the p_cells of the MEC array are capable of holding several groups of Q pixels from an M×M block of pixels, wherein Q<M. In particular, the p_cells can hold Q pixels from a matchblock, Q pixels from a reference block, and Q pixels from the predicted data block. With one particular implementation of the present invention, M=16 and Q=4.

In another aspect in accordance with the present invention, the boundary cells enable the storage of data that has moved outside the boundaries of the sub-array. By storing such data in the boundary cells, the MEC cell array can readily obtain such data when needed. This improves processing speed because the data stored in the boundary cells do not need to be retrieved from external storage, which is typically associated with longer access times. Additionally, the boundary cells are beneficial in increasing the overall size of the cell array, and this increased size provides further improvement to the amount of data that can be processed. This is particularly useful for VLSI, SoC and ASIC applications, which typically have increasingly small "real-estate," that is, chip area and size.

The present invention overcomes the limitations of conventional video processing systems by using an MEC array having a simple design, routing and placement of logic and circuit components. By duplicating a small amount of random logic (i.e., the p_cell) to form the sub-array, a larger cell array can be easily achieved based on simple interconnections coupling together adjacent p_cells. By introducing this MIMD architecture in the cell array, the capability of handling complex instructions and processing is further achieved. One advantage of the present invention is that data traffic is minimized according to one embodiment of the present invention, which utilizes a 36 bit bandwidth. This is beneficial for VLSI, SoC and ASIC applications.

The video compression system in accordance with the present invention also includes a method of motion estimation and compensation processing, overall having three stages of multi-resolution searching, followed by YUV estimation and decompensation. In the first stage, the method includes the determination of a set of partial motion vectors each associated with groups of pixels forming a given picture. A partial pixel level search is performed on sub-blocks of pixels, formed from decomposing the matchblock of the current frame into Q×Q sub-matchblocks, and from decomposing the search area of the reference frame by a similar factor. Exhaustive Q×Q searches are performed in parallel on each decomposed matchblock which is duplicated and overlaid with each corresponding decomposed search sub-block in order to determine a preliminary motion vector.

In the second stage, the method further includes the generation of an intermediate (full) motion vector having finer granularity than the preliminary motion vector. To do so, a full pixel level search of the full size macroblock is performed around an area of the preliminary motion vector. Because the macroblock has already been loaded in the MEC cell array during the partial pixel level search, only a refined area need be loaded into the cell array, thereby saving overall processing time.

With the third stage, the method comprises performing a fractional (e.g., half) pixel search using the results of the full pixel level search. In particular, the full size macroblock is searched with a refined search area based on the full pixel level search to determine a final motion vector of improved granularity.

One aspect in accordance with the present invention is that the three stages of multi-resolution search method results in a motion estimation and compensation algorithm that is fast because it involves less computations than conventional methods. The algorithm is also fast due to the parallel processing of the motion vectors undertaken in the MEC cell array, and contemporaneously with preloading of data in the stream buffer. Another aspect in accordance with the present invention entails the method improving the quality of the motion estimation by incrementally refining the motion vector throughout the three stages. As a result, the calculation intensive steps associated with the conventional encoding process are substantially reduced with the present invention.

In general, the present invention takes advantage of temporal redundancies amongst frames by undertaking block-based differences between frames of current and reference images that have been split equally into several sub-blocks. For each sub-block, a search is performed for similar blocks in a reference frame, which also has been sub-sampled by a factor of Q. With the MEC cell array, parallel processing of a plurality of these Q×Q sized sub-blocks is enabled.

The features and advantages described in this summary and the following detailed description are not all-inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The teachings of the present invention can be readily understood by considering the a following detailed description in conjunction with the accompanying drawings.

FIG. 1B is an illustration of additional exemplary applications of FIG. 1A.

FIG. 8 is an illustration of a set of pixels and corresponding fractional pixel locations.

Figure 1A:
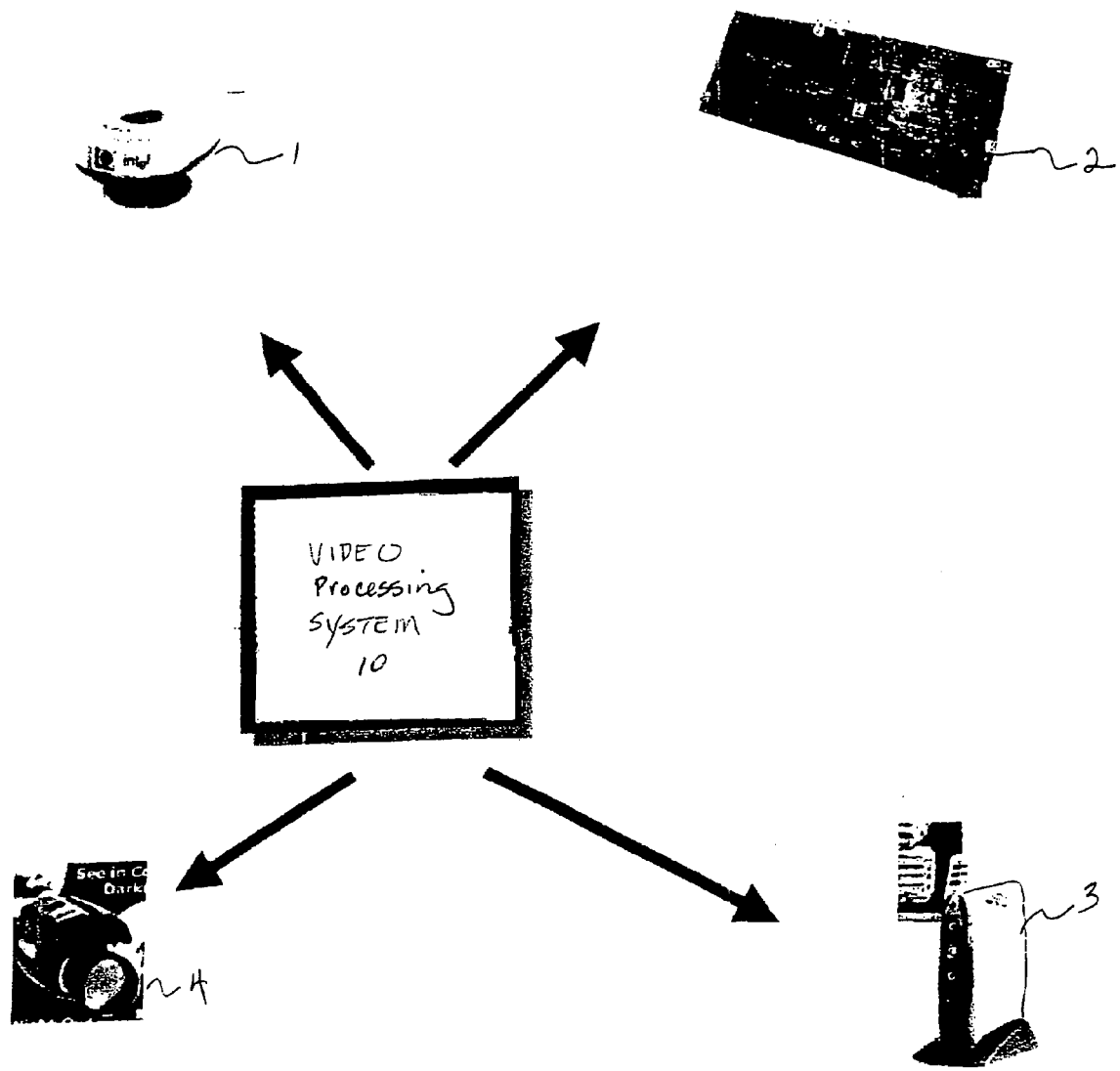
FIG. 1A is an illustration of various exemplary applications that work suitably well with the video processing system in accordance with the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Introduction

A system, method, computer medium and other embodiments for video encoding, motion compensation and improving motion estimation are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention with unnecessary details.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like. Furthermore, it has also proven convenient at times, to refer to certain arrangements of steps requiring physical manipulations of physical quantities as (modules) code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer-based system memories or registers or other such information storage, transmission or display devices.

Throughout the description presented, reference will be made to the symbol "x" as indicating a multiplication operation, and as a description of the number of rows by the number of columns in an array, depending on the context. When the symbol "x" refers to a multiplication operation, the symbol "·" may be used interchangeably as will be recognized by those skilled in the art. In general, the context where the symbol "x" refers to the number of rows by the number of columns in an array arises in describing a block of pixels representing an image.

One aspect of the present invention includes an embodiment of the process steps and instructions described herein in the form of a computer program. Alternatively, the process steps and instructions of the present invention could be embodied in firmware or hardware, and when embodied in software, could be downloaded to reside on and be operated from different platforms used by video processing systems and multimedia devices employed with real time network operating systems and applications.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. In one aspect in accordance with the present invention, a Multiple Instruction stream Multiple Data stream (MIMD) computer architecture will be described, wherein each processor operates to process its own set of instructions simultaneously and independently of others.

The algorithms and displays presented herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Reference will now be made in detail to several embodiments of the present invention, examples of which are illustrated in the accompanying drawings. Wherever practicable, the same reference numbers will be used throughout the drawings to refer to the same or like parts.

FIGS. 1A–1B are illustrations of various exemplary applications in which the video processing system 10 in accordance with the present invention will work suitably well. Such applications include a high quality PC video camera 1 used for video conferencing or as a video recorder. Another application includes video capture boards 2, which may be enabled with MPEG-1, MPEG-2, MPEG-4, H.263 and H.261 capability. Yet another application includes a video capture box 3 which may be enabled with MPEG-1, MPEG-2, MPEG-4, H.263 and H.261 capability, by way of example. Video capture boxes 3 can also be used for time shifting purposes. Still another application comprises an IP (Internet Protocol)-based remote video surveillance system 4 outputting MPEG-1, MPEG-2, MPEG-4 or other type of video format. One type of video format that works suitably well in accordance with the present invention is a WIS GO Stream format from WIS Technologies, Inc. of San Jose, Calif. In FIG. 1B, other applications that are well-suited for video processing system 10, include the following: (1) high quality video cameras 5 with full D1 broadcasting quality; (2) personal digital assistants 6 operable as a video camera or as a visual communication device; (3) mobile visual communication devices 7; (8) portable wireless telephones 8 enabled to operate with visual communication by MPEG-4 over CDMA; and (9) personal video recorders (PVRs) 9 also known as digital video recorders (DVRs), and STB, along with other devices providing a home video gateway, visual conferencing and multimedia communication. It will be appreciated by those skilled in the art that the above-mentioned types of applications are only examples, and that the video processing system in accordance with the present invention works suitably well with a wide variety of applications.

Figure 2:
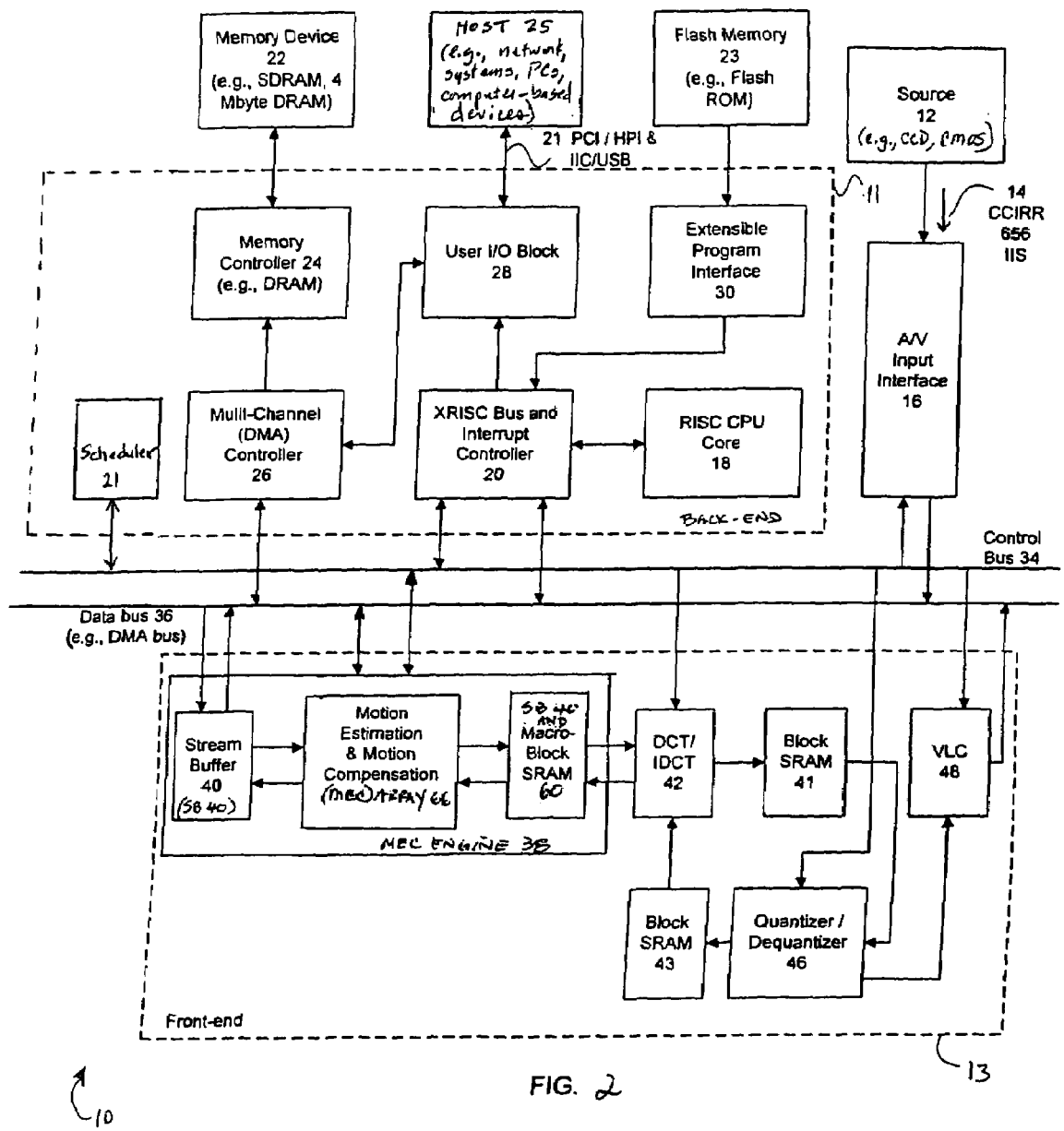
FIG. 2 illustrates a block diagram of one embodiment of a video processing system in accordance with the present invention.

FIG. 2 illustrates one implementation of a video processing system 10 that may be used to perform the motion estimation and compensation processing in accordance with the present invention. One aspect of video processing system 10 includes video compression of moving images as part of an encoding process. From the discussion to follow, it will become apparent that the present invention is not limited to the system 10, but may work suitably well with other video processing systems and video compression systems. In the implementation of FIG. 2, system 10 includes a processor-based platform 11 (back end 11), and a front end 13. Data from source 12 is received by an audio/visual (A/V) interface 16. The AV interface 16 is synchronized with a pixel clock PCLK (not explicitly shown), which may be operating at a low frequency, like 27 MHz by way of exmaple. A data (pixel) bus 14 allows the transfer of pixel data from the source 12 to the AV interface 16. Every clock cycle, a pixel can be input through the pixel bus 14 with a valid pixel signal. Those skilled in the art will recognize that the input timing can be controlled by horizontal and vertical synchronize signals.

The source 12 may be a multitude of devices that provide a digitized video bit stream (data stream), like for example, from a Complementary Metal Oxide Semiconductor (CMOS) device or Charge Coupled Device (CCD) sensor (with or without glue logic) like that used in a digital camera and PC camera. Other types of source devices that may work suitably well with the present invention, include by way of example, the Philips® 711x video digitizer and processor chip. By way of background information, in a digital camera, CCDs can be analogized to operating like film. That is, when they are exposed to light, CCDs record the intensities or shades, of light as variable charges. In the field of digital cameras, the charges are converted to a discrete number by analog to digital converters. It will be recognized that other types of sources capable of generating a digitized video bit stream may work suitably well with the present invention, including sources in the nature of a personal video recorder, a video-graphics capture and processor board, and a digital CAM recorder.

In general, source 12 generates an uncompressed video data bit stream 14, which may be of multiple formats. By way of example, the format of data stream 14 can comply with the CCIR (Consultative Committee for International Radio, now ITU-R) 601 recommendation which has been adopted worldwide for uncompressed digital video used in studio television production. This standard is also known as 4:2:2. Also, data stream 14 may be the parallel extension standard, namely CCIR 656 with PAL and NTSC, which had been incorporated into MPEG as the Professional Profile. CCIR 656 sets out serial and parallel interfaces to CCIR 601. Other suitable video formats include: YUV 4:2:2 interlace; 8-bit YUV with Vsysnc/Hsysnc/Fodd or Vref/Href format, interlace and progressive; 10-bit RGB Bayer with Vsysnc/Hsync CMOS sensor format. The support size can vary from 352×288 to 720×480 (30 fps) or 720×576 (25 fps), while the support input frame rate can vary from 10 fps to 30 fps. It is noted that these values are provided by way of example, and that the invention is not limited to these formats and parameters, but may work suitably well with other types of formats and parameters. When data stream 14 includes an audio component, the format of the data stream could also be in IIS (inter IC signal) format. Of course, the appropriate IIS data rates, which typically are at speeds of several Mbits/second, may be selected for transferring audio data. It will be appreciated that CCIR 656 and IIS are only examples of possible digital data formats, and that other formats are equally possible. A/V interface 16 includes necessary ports and circuitry to receive the incoming (video and/or audio) signals and to buffer data from such signals.

The base platform 11 is preferably a general microprocessor-based computing system. In one implementation, the electronics of platform 11 are implemented as a single ASIC incorporating a processor 18, a system controller 20, memory device 22, memory device controller 24, a multichannel (e.g., Direct Memory Access DMA) controller 26, an input/output (I/O) interface 28, and an extensible program interface 30. In particular, the processor 18 may be any suitable processor with on-chip memory for encoding subsampled video signals, such as an Intel i860 pixel processor, programmed to implement the motion estimation and compensation techniques of the present invention. Preferably though and according to one implementation, processor 18 is a RISC-based CPU capable of controlling and coordinating the transfer of blocks of data, but not necessarily handling the video processing. By doing so, this keeps manufacturing costs of system 10 low, which is particularly beneficial when system 10 is utilized in VLSI, ASIC and System-on-Chip (SoC) applications. By way of example, suitable general parameters for choosing a low cost RISC CPU 18 include a 16 bit arithmetic logic unit (ALU), an 18 bit instruction set, and an operating speed up to 100 MHz. Exemplary applications suitable for the incorporation of system 10 include digital video recorders, remote video surveillance systems, video capture boxes, small portable handheld devices such as digital cameras, multimedia-enabled cellular phones and personal digital assistants (PDAs), and other media-based devices and appliances. The (XRISC) bus and interrupt controller 20 handles the workflow of the data and control signals for the computing processes of CPU 18, including for example, handling hardware and software interrupts, as well as those I/O signals generated. Memory device 22 may be any suitable computer memory device for storing picture data, such as a video random access memory (VRAM) or dynamic RAM (DRAM) device, under the control of memory device controller 24. Memory device 22 is shown as being external to platform 11 in FIG. 1, but may be integrated into platform 11 in other embodiments of system 10. In one embodiment where memory device 22 is a DRAM, controller 24 is selected to be a corresponding DRAM controller performing the physical transfers of data between the memory device 22 and the multichannel controller 26. In this embodiment, controller 26 may be a DMA controller selected to accommodate any suitable number of DMA channels used to transfer the retrieved video data into packed pixel format or planar bit maps, typically from the memory device 22 to each data block for processing by the MEC engine 38. By way of example, DMA controller 26 may use 8, 32 or any other number of channels, to transfer data from the DRAM 22 to each data block without necessarily utilizing the processing resources of CPU 18. In one embodiment, the DMA controller 26 is designed as a two-dimensional controller, operating on at least an instruction of pre-specified length, along with a start command, and source address. The multi-channel DMA controller 26 can include a plurality of channels, each with configuration registers holding information, such as the start address of data, the end address of data, the length of data transferred, type of stop transfer mechanism, and the source address of the data. Alternatively, the multi-channel controller 26 may facilitate the transfer of data from I/O block 28 to MEC engine 38, including by way of example, data from a host bus 21 coupled to I/O interface 28.

I/O interface 28 couples system 10 to various external devices and components, referred to as hosts 25, using a variety of data standards and formats. For example, I/O interface 28 can include an output format along host bus 21 compatible with: a Peripheral Component Interconnect (PCI) bus typically having a wider bandwidth than the traditional ISA bus, and allowing peripherals to transfer data at higher speeds; a Universal Serial Bus (USB) hardware interface for low-speed peripherals such as the keyboard, mouse, joystick, scanner, printer and telephony devices, and also MPEG-1 and MPEG-2 digital video; IIC (inter IC control); and Host Parallel Interface (HPI). These types of ports in I/O interface 28 are only examples of possible port data formats, and other formats are equally possible. I/O interface 28 can be coupled to a variety of different hosts 25, including for example, PCs, applications supported by network enabled systems, servers, high quality PC video cameras for video conferencing, video recorders, video capture boards for MPEG-1, MPEG2, MPEG-4, H.263 and H.261, IP based remote video surveillance systems, video capture boxes for time shifting purposes, network computing systems, mobile visual communication, wireless communication by MPEG-4 over CDMA, and PDA enabled with multimedia features. Hosts 25 include driver level transcoding software to convert the compressed stream of data from I/O block 28 into MPEG-1, MPEG-2, MPEG-4, H.263 formats, by way of example.

Extensible program interface 30 enables data to be loaded into system 10 from flash memory device 32. A flash memory typically stores its content without the need for power, unlike a DRAM. Any number of suitable flash memory 32 devices may be used with the present invention, such as digital film in a PC card, a flash ROM, memory stick formats, and SmartMedia.

The A/V interface 16, bus and interrupt controller 20 and multichannel controller 26 are coupled to one or both of a control bus 34 and data bus 36. According to one implementation, data bus 36 is a DMA bus. However, data bus 36 may be any suitable digital signal transfer device, including an Industry Standard Architecture (ISA) bus, an Extended ISA (EISA) bus, a PCI bus, or a VL bus. When data bus 36 is a DMA data bus, after initialization and during active capturing of the incoming video signal, DMA controller 26 requests the DMA bus 36 and, after acquiring the bus, will perform burst writes of video data to the memory 22 to be described further with MEC engine 38. In the particular implementation, databus 36 is selected to be 36 bits, which is a suitable width for VLSI, ASIC and SoC applications. It will be recognized that overflow handling capability can be designed with controller 26 in the event that excessive bus latency is experienced.

The front end 13 includes a motion estimation and compensation (MEC) engine 38 having a stream buffer (SB) 40 with a macroblock SRAM 60, discrete cosine transform (DCT) and inverse DCT (IDCT) module 42, buffers such as block SRAMs 41 and 43, a quantizer and dequantizer module 46, and a variable length coding (VLC) encoder 48. The MEC engine 38 and stream buffer 40 will be described below in more detail. The DCT/IDCT module 42 provides block-based orthogonal transformation of a block of picture elements to a matrix of spatial frequency coefficients in order to reduce spatial redundancy, typically after motion compensation prediction or interpolation. By way of example, the internal accuracy of the DCT/IDCT module 42 can be 17 bits, with a DCT output saturated to 8 bits or 12 bits. Two aspects of the DCT/IDCT module 42 are to provide a very small error over the ideal floating model, and to reduce the mis-match of decoding function to be as small as possible. The quantizer/dequantizer module 46 provides further data compression when mapping the data to a representation that strips away unnecessary information, in general, based on zig-zag scans over the macroblock. The macro-block SRAM 60 is a memory device for storing the picture data used by front end 13. Block SRAMs 41 and 43 are shown as separate modules in FIG. 1, but may be part of the same component, and are generally used to store block data at various stages of the encoding process. Where the MEC engine 38 needs to share on-chip SRAM with other modules (e.g., DCT/IDCT 42), a programmable scheduler 21 can be included to coordinate the operation of various modules and processes in system 10.

In FIG. 2, a general block diagram is provided for the DCT/IDCT and quantization and dequantization functionality. Those skilled in the art will recognize that these functions may be provided in a variety of ways. For example, the output of the discrete cosine transform module 42 is quantized. An output of quantizer 46 can be reconstructed through inverse quantizer 42, and provided through inverse DCT 42 for storage in memory, like macro-block SRAM 60 so that it may undergo decompensation. The general purpose of subjecting the output of quantizer 46 through inverse quantization and inverse DCT 42 is to determine a difference macroblock that is lossy. When data is summed with the output of the MEC engine 38 along with dedicated object-based motion prediction tools (not shown) for each object, a lossy version of the original picture can be stored in SRAMs 4 or 43. Those skilled in the art will appreciate that motion texture coding, DCT-based texture coding (e.g., using either standard 8×8 DCT or shape-adaptive DCT) may also be provided with front end 13. It is noted that DCT/IDCT module 42 and quantizer/dequantizer module 46 not only provide the above functions during the encoding process, but are capable of emulating a decoder for the reconstruction of frames based on receiving the reference frames along with the motion vectors. To this end, the functional blocks 38–48 are capable of operating as a codec.

The VLC encoder 48 provides lossless coding to assign shorter code words to events occurring frequently and longer code words to events occurring less frequently. The use of a VLC is typically useful for reducing the number of bits used during encoding and video compression of motion data. The transform coefficients are quantized and the quantization label encoded using a variable-length coding.

Those skilled in the art will recognize that the blocks of FIG. 2 are functional blocks that may be implemented either by hardware, software, or a combination of both. Given the functional description of these blocks, those of ordinary skill in the art will be able to implement various components described using well-known combinational and/or sequential logic, as well as software without undue experimentation. Those skilled in the art will appreciate that the present invention is not limited to the video compression system described above, but is applicable to any video processing system.

Figure 3:
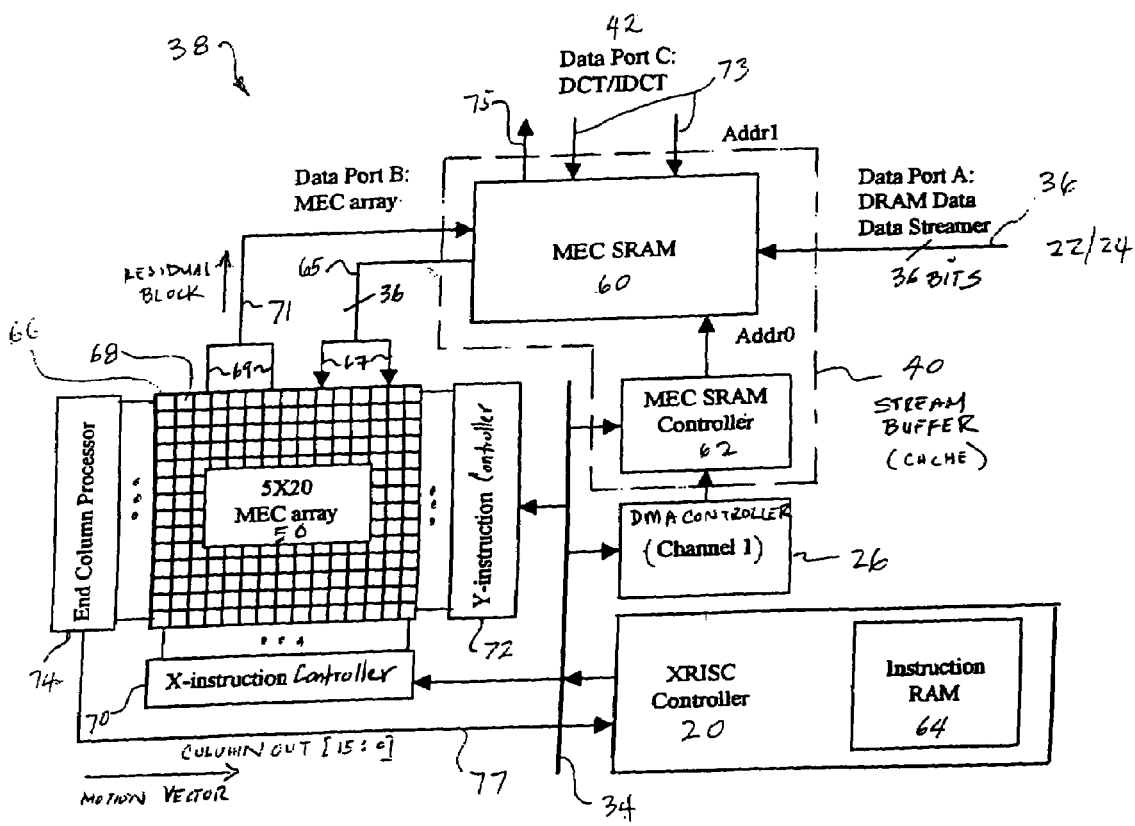
FIG. 3 is a detailed block diagram of a particular embodiment of the motion estimation and compensation (MEC) engine of FIG. 2.

Reference is now made to FIG. 3 to further describe an embodiment of the motion estimation and compensation (MEC) engine 38. In the embodiment of FIG. 3, similar reference numerals are used for common components already described, primarily for convenience. The stream buffer 40 generally functions to manage access requirements from at least three different devices, that is, the MEC cell array 66, the DMA controller 26 and the DCT/IDCT module 42. It will be understood by those skilled in the art that the stream buffer 40 will require interfaces in order to communicate with these devices. For example, one interface connects the stream buffer with the DMA controller 26, another interface connects the stream buffer with the DCT/IDCT module 42, and yet another interface connects the stream buffer to the MEC array 66. One aspect of the stream buffer is to buffer the data loaded from the memory device 22 by the controllers 24 and 26. The data generally are organized in block type, wherein the block may include programmable x and y size. The stream buffer 40 will be read/written by the MEC array 66. The read and write instructions are typically burst with a programmable length, from a programmable start address, and by one of several predefined burst modes. It is advantageous to package the sequential data loaded from the memory device 22 to structures required by the MEC array 66 so that the order in which the MEC array 66 reads data can be different from the order in which data are read from the memory device 22.

In the particular embodiment shown in FIG. 3, the stream buffer 40 includes: an SRAM 60 shared by the devices 66, 26 and 42; and a controller 62. SRAM 60 in one embodiment is 36 bits wide with a 1 Kbit word depth, thereby having a 36×1024 bit capacity with single port. Instruction RAM 64 is a storage cell (e.g., RAM, RISC file) that is accessed by the controller 20 for use by the CPU 18. The stream buffer 40 may include a register file that functions as a lookup table for converting all input logic address to its actual physical address. This lookup table can be accessed by the control bus 34. The XRISC controller may be designed to set the lookup table in the stream buffer through the appropriate interface, so that a host device may be able to read and write the SRAM cells through this interface.

The MEC engine 38 includes an MEC array 66 of cells 68. Databus 65 couples the MEC SRAM 60 to array 66, and can be 36 bits wide by way of example. Because array 66 comprises numerous cells 68, the data over bus 36 may be duplicated over lines 67, and received by appropriate cells 68. To facilitate this one-to-many mapping (databus 65 to datalines 67), it will be understood that an instruction may be provided from the XRISC controller 20 to indicate which cells accept (e.g., select) data over datalines 67. Datalines 69 carry the output from the cells 68 of array 66. The types of data that may be transferred from the stream buffer 40 to the MEC array 66 include pixel data, and the residue or predicted data of a matchblock or reference block. The types of data that may be transferred from the MEC array 66 to the stream buffer 40 include the predicted data, residue data, and the reconstructed data of the macroblock. Similarly, an instruction programmed by XRISC controller 20 may be used to select amongst datalines 69 the residual data to be transferred over databus 71. SRAM 60 also has inputs and outputs 73 and 75 (data port C) for communication of the residual information that has been further processed by the DCT/IDCT 42 (and quantizer 46) to finally optimize the compressed video stream.

The MEC array 66 is coupled to two IC controllers, namely an X-instruction controller 70 and a Y-instruction controller 72, as well as to an end column processor 74. X and Y instruction controllers 70 and 72 allow the XRISC controller 20 to configure an instruction set, and can be programmed to receive commands from controller 20. In response, the controllers 70 and 72 can make decisions and provide instructions (e.g., branch, jump) to the cells 68 of array 66. For example, the instructions may be 32 bits in length for the x control, and 24 bits in length for the y control. Each IC controller 70, 72 may include register files (not shown) to store instructions to be executed by the MEC cell array 66. These register files may utilize a handshaking protocol to fetch the instructions, decode them, and send them to array 66 for 3 further execution. Column processor 74 receives data from the column cells 84 (to be described) after the MEC array 66 completes it calculations. Column processor 74 provides further comparison and processing in deciding which match is the best during the motion vector processing to be described, and subsequently outputs the final motion vector along data line 77, which can be read by the XRISC controller 20 and sent to the VLC 48 for encoding, and subsequently to the DRAM 22.

Figure 4:
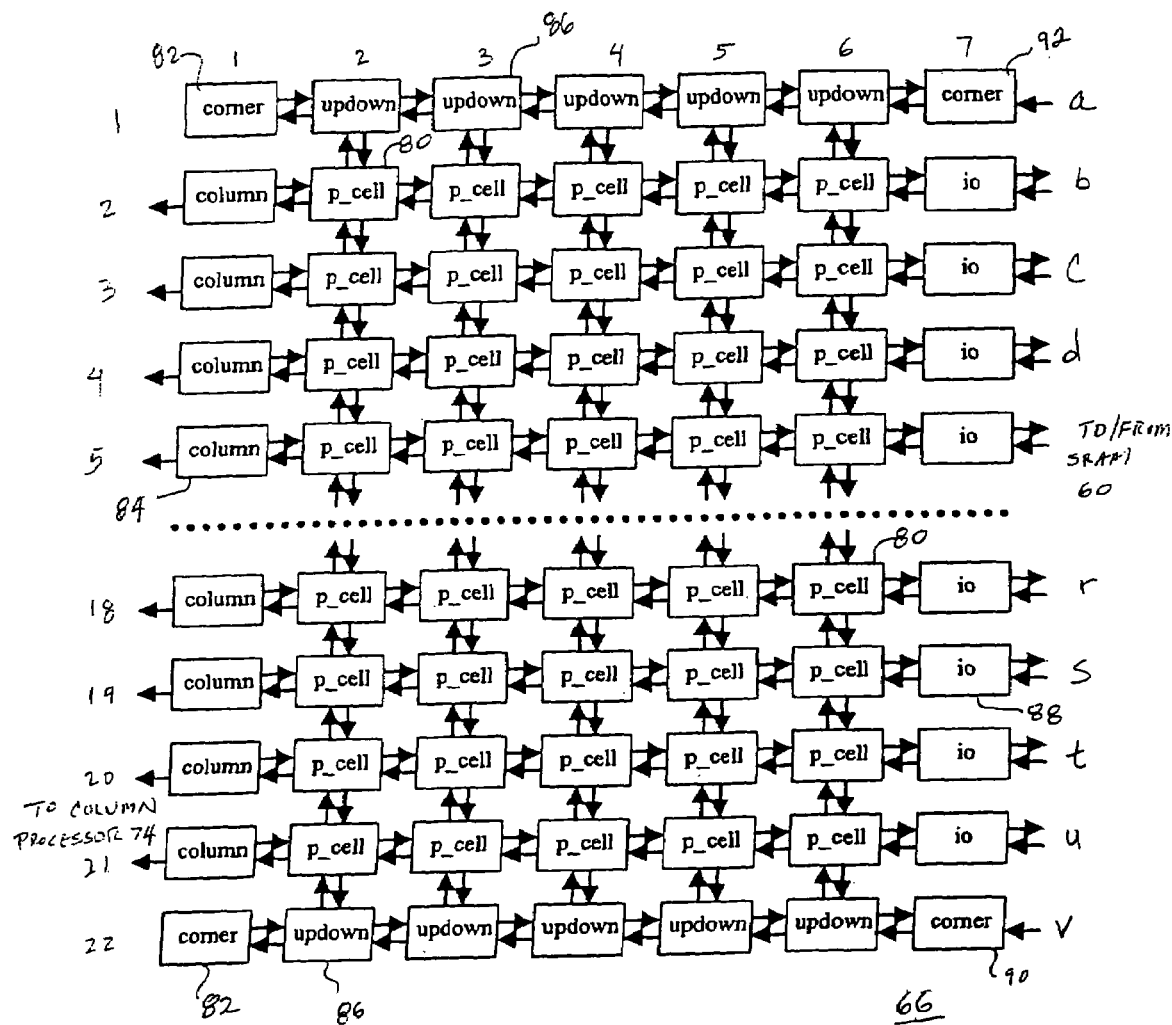
FIG. 4 is a block diagram of a particular embodiment of the cell array for the MEC engine of FIG. 3.

Referring to FIG. 4, one embodiment of the MEC array 66 is shown. The MEC cell array 66 is a processor cell array that includes 7×22=154 cells 68, a portion of which comprises a sub-array 50 (shown in FIG. 3) having 5×20=100 cells, each used for processing (i.e., major computing) and referred to as p_cells 80. MEC array 66 further includes 4 types of boundary cells, namely corner cells 82, column cells 84, updown cells 86 (5 up, 5 down), and io cells 88, which are generally used to store data for use by various components of the MEC engine 38. The interconnections of the p_cells 80 include 4 inputs and 4 outputs so that data can be transferred to each p_cell 80 from a neighboring p_cell 80 in the array 66. One aspect of the present invention is to reduce the complexity of the routing, placement, and layout of logic of the MEC cell array 66. With the embodiment of FIG. 4, this is achieved because each p_cell 80 of the 5×20 sub-array 50 is connected to its neighboring p_cell 80. This simplifies the logic design complexity to providing adjacent interconnections amongst p_cells 80. With a simple layout, placement and routing of logic, manufacturing costs of system 10 are reduced, which is particularly beneficial for SoC and ASIC applications.

The interconnections of corner cells 82, 90 and 92 include an input and an output from an adjacent horizontal updown cell 86. The two corner cells 90 and 92 each accept data inputs from the SRAM 60. The interconnections of the columns cells 84 include an input and output to an adjacent horizontal p_cell 80, and an output to the end column processor 74. The interconnections of the updown cells 86 include an input and output to an adjacent vertical p_cell 80 and two inputs and two outputs to adjacent horizontal cells, which may be two updown cells 86 or a combination of an updown cell 86 and a corner cell 82. The interconnections of an io cell 88 include two pairs of inputs and outputs, one pair for an adjacent horizontal p_cell 80, and the other pair for communication with the SRAM 60.

Each p_cell 80 can hold several groups of Q pixels for a block. The reference to Q will be described subsequently in more detail. In one embodiment in accordance with the present invention, the p_cell 80 can hold up to Q×3 pixels, including Q pixels from the reference block, Q pixels from the matchblock, and Q pixels from the predicted data. By way of example, if Q=4, then p_cell 80 can hold 12 pixels, comprising 4 continuous pixels in a row of reference data, 4 pixels of matchblock data, and 4 pixels from the prediction (or residue or reconstructed) data. The p_cell 80 should also be enabled to perform local calculation, as well as concurrently allow data to be moved to another cell. Furthermore, the p_cell 80 can hold an instruction combined with x-control and a y-control information as will be described in FIG. 5. In this particular implementation of FIG. 4, the p_cells 80 collectively can hold 20×20 pixels, since each cell can hold 4 pixels for a block. However, with the addition of the boundary cells 82, 84, 86, and 88, array 66 can hold 22×22 pixels, the significance of which will become apparent from the subsequent discussion.

In particular, io cells 88 enable the input and output of data between SRAM 60 and sub-array 50. For example, the io cells 88 receive image data from the SRAM 60 over datalines 67, and output residual data to the SRAM 60 over datalines 69. Corner cells 82, 90, 92, updown cells 86, column cells 84, and io cells 88 provide boundary storage, which enables data storage when a block of data in the sub-array 50 moves outside of the boundaries of array 66. For example, if data that is moved upwards from the p_cells 80 toward the updown cells 86 is not stored in the updown cells 86, it will be lost. By storing data that moves outside of the boundaries (up, down, left, right) of array 66 in these boundary cells, such data can be readily obtained when the previously-moved data re-enters the boundary. Those skilled in the art will appreciate that the accumulation and computational functionality of boundary cells 82, 84, 86, 88, 90 and 92 can be implemented in a variety of ways with conventionally known logic. The boundary cells are further beneficial for increasing the overall memory of the array formed by the p_cells 80, which is particularly useful for processing a very large frame. Corner cells 82, 90 and 92 provide further memory storage when pixels are moved up, down, left and right.

In accordance with one embodiment of the present invention, MEC engine 38 interfaces with an external DRAM 22 to obtain picture data and to store processed picture data over databus 36. Picture data read from the DRAM 22 is received by the io cells 88 from the SRAM 60 controlled by SRAM controller 62. This is generally referred to as pre-loading the data. The io cells 88 can shift the data received to the sub-array 50 of p_cells 80 for processing. The array 66 is enabled to perform calculations on the data received from the io cells 80, and because stream buffer 40 functions as a programmable cache, contemporaneous with such array processing, additional data can be pre-loaded from DRAM 22 into the SRAM 60 for the next set of processing operations. Stream buffer 40 thus enables the MEC array 66 to perform motion estimation processing and when the array 66 is not accessing the stream buffer 40, the stream buffer can pre-fetch data from the memory device 22 for the next MEC operations in parallel. This parallel processing capability improves the efficiency and speed of the MEC engine 38. Furthermore, data that is used more than one time by the MEC cell array 66 can be stored in the stream buffer thereby avoiding the need for the memory controllers 24, 26 to load them again from the memory device 22.

Figure 5A:
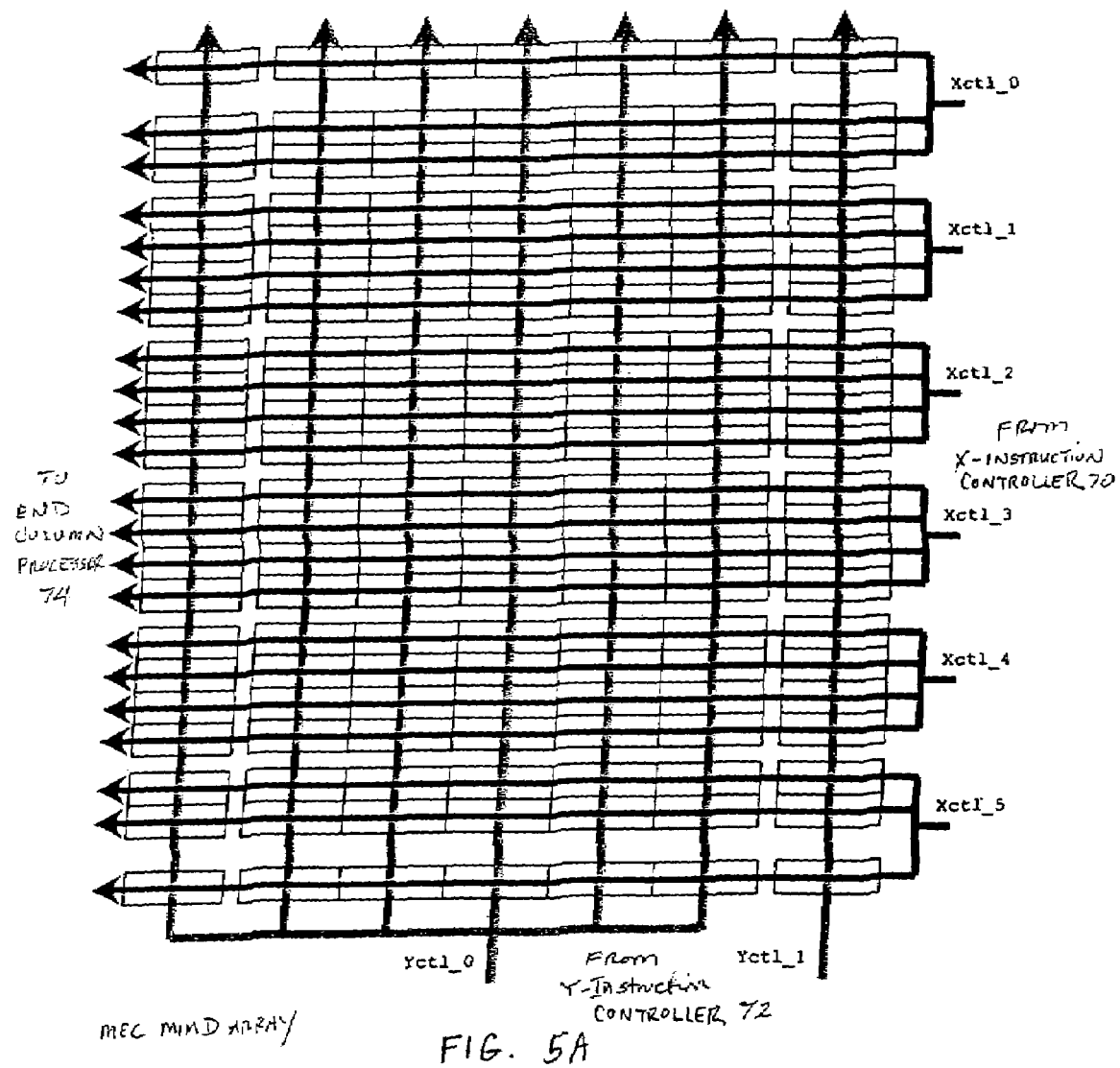
FIG. 5A is a data flow diagram of a particular implementation of control signals for the MEC cell array according to an MIMD arrangement.

FIG. 5A shows an implementation of the instruction signal distribution for controlling the MEC array 66. X-instruction controller 70 and Y-instruction controller 72 each receive respective control signals over bus 34 from the XRISC controller as shown in FIG. 3. The X-instruction controller 70 provides x coordinate control signals to array 66 over lines labeled Xctl_0, Xctl_1, Xctl_2, Xctl_3, Xctl_4, and Xctl_5 as seen in FIG. 5A. The Y-instruction controller 72 provides y coordinate control signals to array 66 over lines labeled Yctl_0 and Yctl_1. For example, to provide x coordinate control, 14 bits may be used, and to provide y coordinate control, 21 bits may be used. It will be understood by those skilled in the art that there are a variety of ways to allocate the bits of the control signals to each of the lines Xctl_0 through Yctl_1. The particular implementation of FIG. 5A is representative of a Multiple Instruction stream Multiple Data stream (MIMD) architecture that enables multiple cells 68 to each process its own set of control instructions simultaneously and independently of others. For example, MEC cell array 66 has an MIMD control arrangement, each p_cell 80 can hold different data and be controlled by different instructions. In order to distribute different instructions from the control bus 34 to different p_cells 80, the present invention separates an instruction into 2 parts, namely x and y. Each part provides partial control of the p_cell 80. That is, for x-coordinate control, each row of cell array 66 receives the same x instruction. Moreover, different rows of p_cells 80 may have different x-instructions, or several rows of p_cells may receive the same x instruction. While cells 68 of a row may have the same x instruction, each p_cell 80 in the row receives different y coordinate instruction control. When combining the x and y control in this manner, each cell 68 of array 66 is capable of processing different instructions.

Figure 5B:
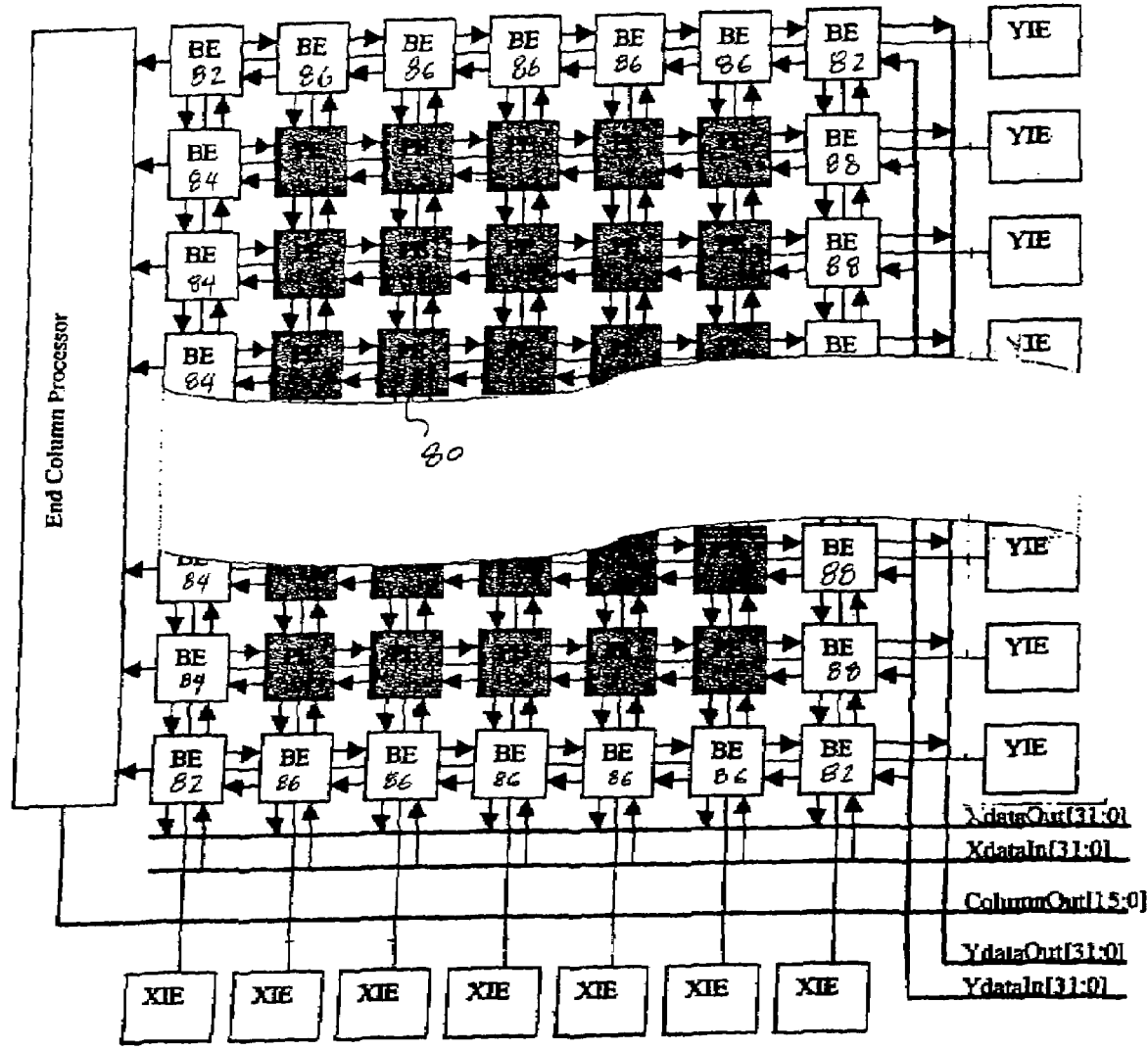
FIG. 5B is a data flow diagram of an alternate implementation of control signals for the MEC cell array according to an SIMD arrangement.

Referring to FIG. 5B, in an alternate embodiment in accordance with the present invention, the MEC cell array 66 also works suitably-well with a Single Instruction stream Multiple Data stream (SIMD) architecture. With the SIMD architecture, instructions are issued for each operation. Accordingly, instruction controllers 70 and 72 are not required. Rather, the XRISC controller 20 generates WRITE instructions each cycle which pass through x and y instruction elements 94, 96 for controlling the operation of MEC array 66. The SIMD architecture is suited to handle hundreds of instructions issued at the same clock to different cells of the array 66. For example, in the same row of cells 68, the same x coordinate instructions are received, yet each cell 68 of the row receives a different y coordinate instruction. Each successive row is provided with separate instructions for each cell 68. Although the embodiment of the MEC array having control signals with an SIMD arrangement is associated with an increased number of instructions and longer program cycles to achieve the similar results obtained by the MIMD embodiment of FIG. 4A, with a single instruction cycle, multiple instructions may be implemented in the cells. As space constraints become tighter with VLSI, SoC and ASIC applications, one way to keep manufacturing costs low is to use lightweight processors and to alleviate video processing operations from the XRISC CPU 18. One manner of accomplishing this is by using separate instruction controllers 70 and 72, which are introduced to issue the control instructions to the array 66. Because the embodiment using the MIMD architecture utilizes fewer number of cycles to perform the parallel processing, it is a preferable implementation as it results in the overall speed for video compression being improved, and allows system 10 to be driven by a lightweight low cost processor 18.

Video compression applied between pictures is facilitated by a process of motion estimation and compensation, wherein a motion vector and difference data is used to specify the translation of a set of picture elements (pels) amongst other pels. The motion estimation technique results in the generation of a motion (estimation) vector (mv). Images of the ith picture and the $i+1^{th}$ picture are processed by an encoder to determine motion vectors which are the basis for which the $i+1^{th}$ and subsequent pictures are encoded for transmission or storage. The bitmaps of the input image are received by the MEC engine 38 in order to derive motion vectors associated with the macroblock data from reference and/or future (subsequent) pictures.

A motion vector is associated with a matchblock, and represents the relative coordinates in a search area of a reference frame at which a particular matchblock of the current frame may be found. The motion vector indicates the relative two-dimensional translation that the image in the matchblock has undergone relative to its coordinates in the reference block. For example, if a motion vector (−3,3) for the a matchblock is located at the coordinates (24, 20) in the current frame, then the corresponding image in the search area of the reference frame is found by moving three pixels to the left and three pixels down in the reference frame.

Accordingly, the image is located at (21, 23) in the reference frame.

In block-based motion compensation, a frame of interest being encoded is divided into block of size M×M. The motion vector for each matchblock in the current frame is calculated by correlating the matchblock with a corresponding search area in the reference frame. That is, for each block, a search of the previous reconstructed frame is done for the block of size M×M that most closely matches the block being encoded. For example, an 8×8 matchblock may be scanned pixel-by-pixel relative to a 20×20 search area in the reference frame. This process can be analogized to having the matchblock overlaid at an initial position within the search area of the reference frame. A matchblock/search area correlation error between the pixel intensity values of the matchblock and the overlaid search area can then be determined. Several 1 techniques may be employed to determine the error measurement therebetween, for example, by determining the mean absolute error or the mean square error. An exhaustive search is typically then performed wherein the matchblock may then be moved one pixel horizontally or vertically within the search area of the reference frame, so that the error at that position can be calculated. This process continues until the error between the matchblock and the search area has been calculated for every position within the search area. A minimum error for all positions is indicative of the highest correlation between the matchblock of the current frame and the search area of the reference frame. The x- and y-coordinate translation of the position of the search area associated with the minimum error is selected as the motion vector for the corresponding matchblock. As such, the term "motion vector" may generally refer to any x and y coordinate translation vector for the search area. When the encoder transmits the reference frame, instead of transmitting subsequent frames, the motion vectors can be transmitted thereby to save time and bandwidth, at least until another reference frame of a source image must be transmitted. Thereafter, motion vectors may be transmitted as before.

An aspect in accordance with the present invention is to determine the motion vector in manner that avoids the large computations conventionally associated with performing the exhaustive search of a search area with the matchblock. It is further desirable to reduce the large number of calculations traditionally involved to determine the motion vector in a manner that will improve the accuracy of motion estimation or maintain a high quality of motion compensation. Accordingly, the operation of the present invention will be described in detail with reference to FIG. 6. Rather than performing the conventional exhaustive search of the marcroblock with a large search area, the present invention describes a three-stage multi-resolution search followed by YUV estimation and decompensation.

Figure 6:
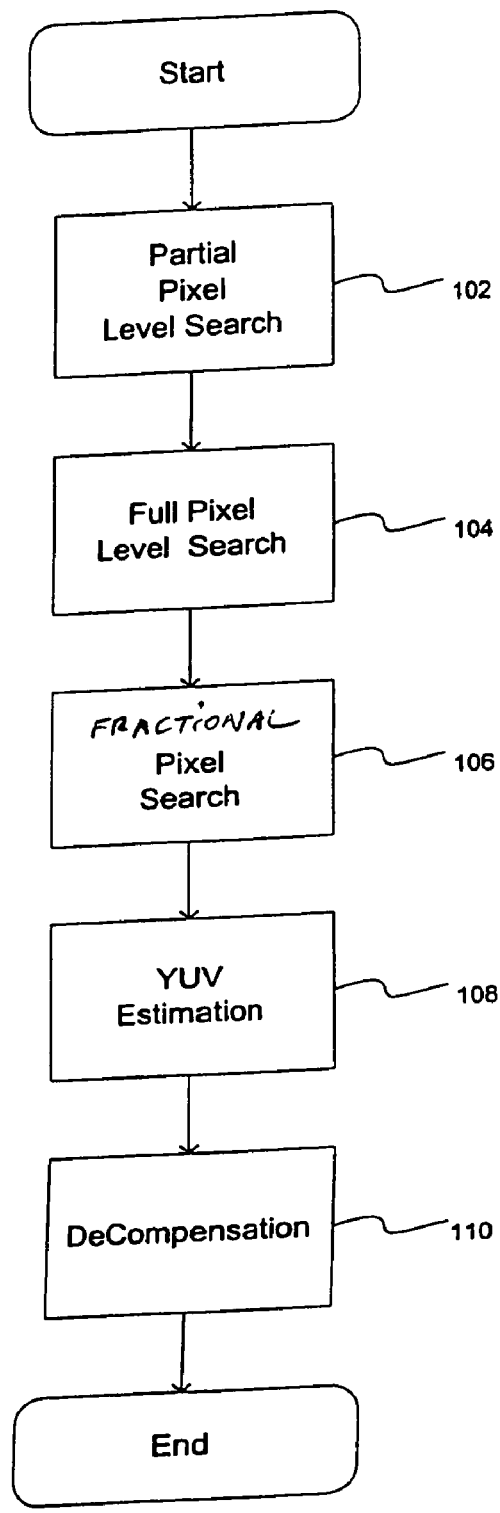
FIG. 6 is a flowchart showing one implementation of a method of motion estimation and compensation processing in accordance with the present invention.
Figure 7:
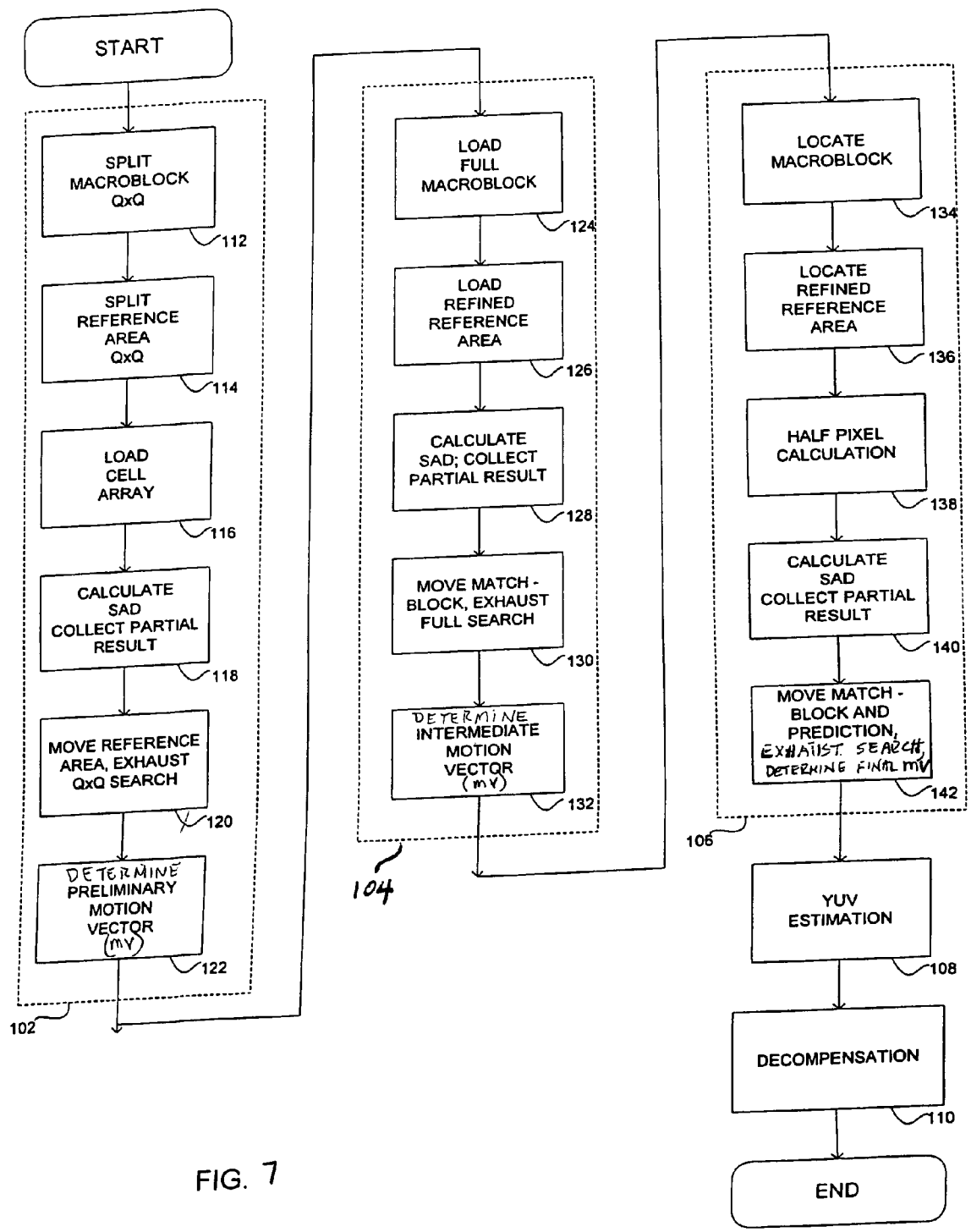
FIG. 7 is a flowchart showing a detailed implementation of the method of motion estimation and compensation processing of FIG. 6.

As shown in FIG. 6, the process 100 of motion estimation and compensation starts with a partial pixel level search 102, followed by a full pixel level search 104, a fractional pixel search 106, YUV estimation 108 and decompensation 110. Each of these functions will be further described with reference to the flowchart of FIG. 7. At times during the discussion, reference will be made to FIGS. 9, and 10A–C for illustrative purposes.

Figure 10A:
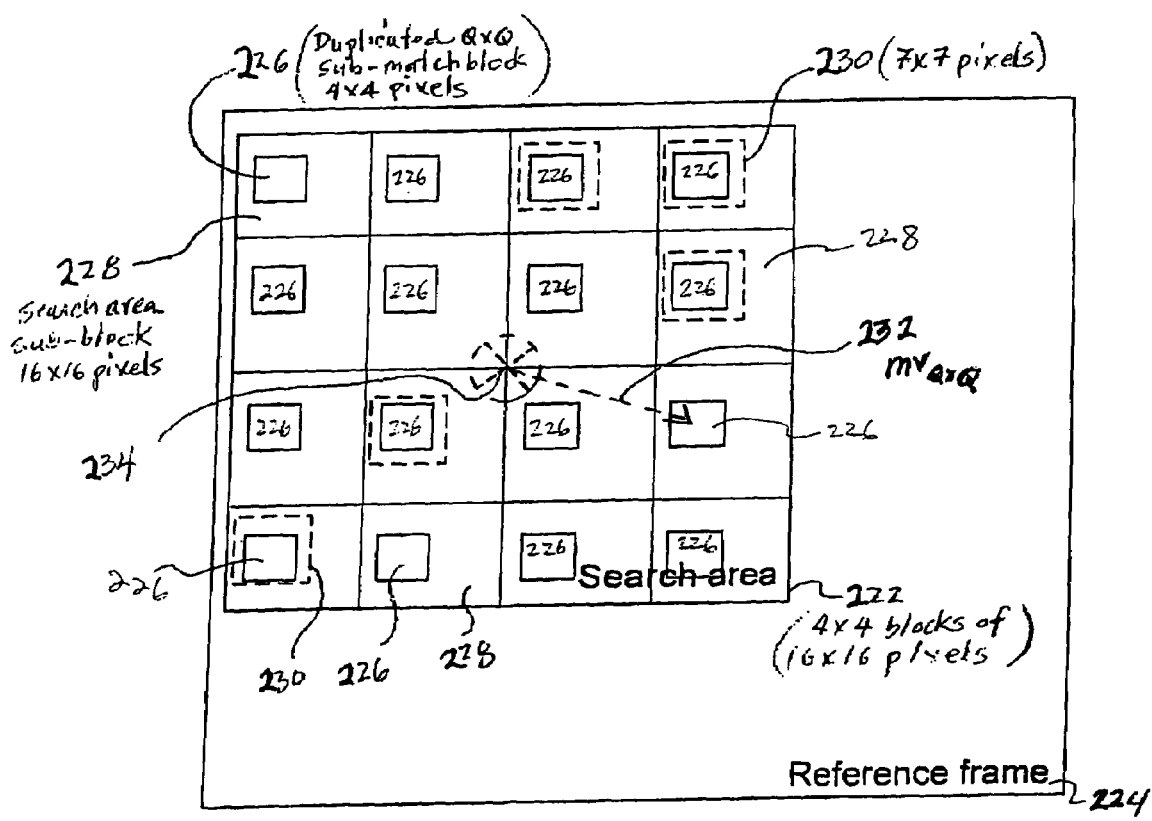
FIG. 10A is an illustration of duplicated QxQ (sub-sampled) sub-matchblocks overlaid to perform parallel exhaustive partial pixel level searching of search area sub-blocks in accordance with the present invention.

In performing the step of partial pixel level searching 102, searches on a smaller picture size (i.e., subsampled pixels) are performed to determine a preliminary motion vector ($mv_{Q \times Q}$) 232. In particular, an M×M pixel-sized matchblock 220 (e.g., macroblock) of a current frame is decomposed 112 (i.e., subsampled) into a smaller size picture, denoted by a sub-matchblock 226 of size Q×Q, where Q<M. At times, reference to Q×Q will be made to $Q^2$, primarily for convenience. For example, if M=16, and Q=4, then a 16×16 block is split into four 4×4 sub-matchblocks to find the preliminary motion vector $mv_{Q \times Q}$ 232 for each 4×4 block. This effectively decomposes the original picture into smaller subsampled pictures from which to interpolate data. For example, if the current frame is 640×480 pixels, then a $Q^2$ size search can be selected to be 4×4, thereby resulting in a block of 160×120 pixels. Each pixel of the $Q^2$ size picture is the average of every 16 pixels forming the original picture. With substep 112, the sub-matchblock will be 4×4, instead of 16×16. Similarly, the search area 222 of the reference frame 224 is decomposed 114 by a factor of Q into search area sub-blocks 228, so that an exhaustive $Q^2$ search can be performed in the (modified) search area sub-blocks 228. In substep 116, $Q^2$ the size (4×4) matchblock data 226 is loaded 116 into the cell array 66, and distributed, that is duplicated to 16 identical ones across each sub-block 228, as seen in FIG. 10A.

Figure 9:
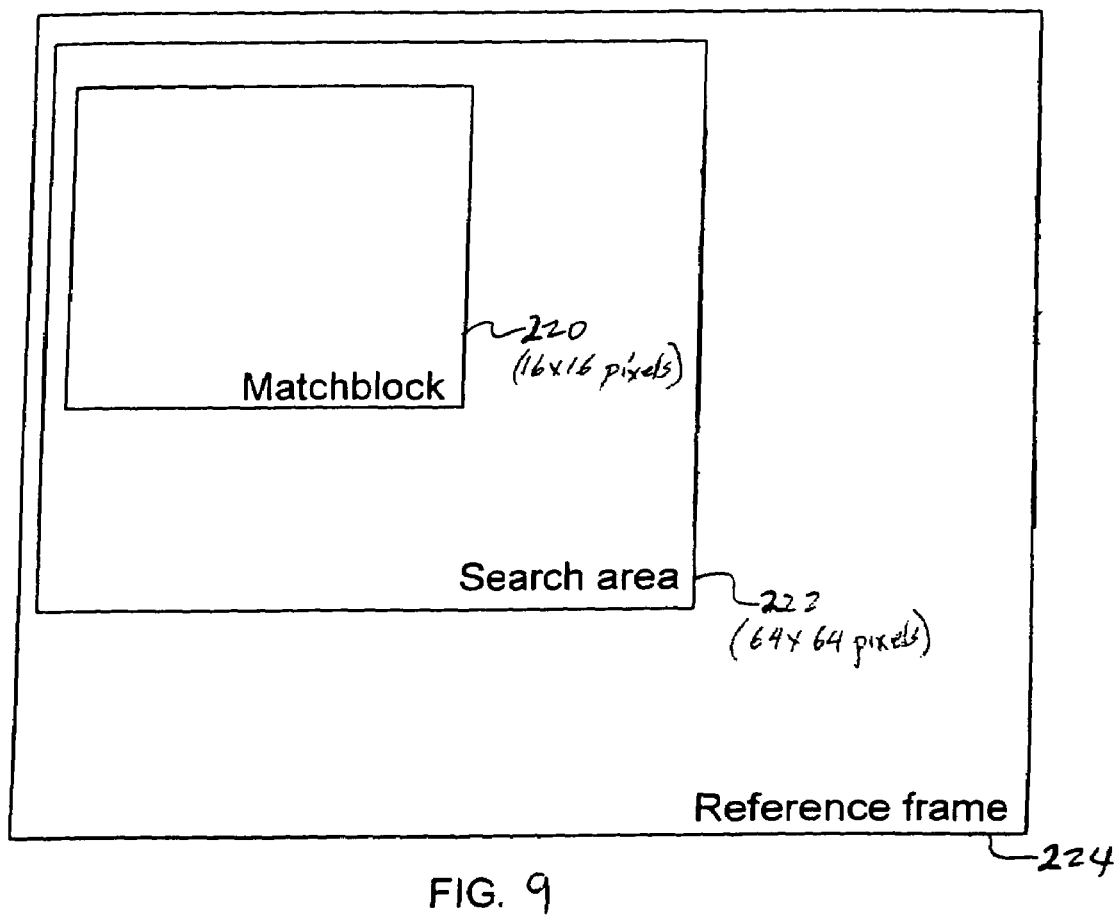
FIG. 9 is an illustration of a matchblock overlaid with a search area of a reference frame for performing an exhaustive search.

Referring to FIG. 9, a matchblock 220 is typically scanned over a corresponding search area 222 within a reference frame 224 to find the best match. This process is repeated for each matchblock in the search area 222. By contrast, when performing the $Q^2$ search of the present invention, several sub-tasks may be performed in parallel. For example, referring back to FIG. 10A, the matchblock 220 has been split (subsampled) into Q×Q sub-matchblocks 226. Similarly, the search area 222 has been split into 4×4 sub-blocks 228, each of 16×16 pixels. Using the MEC cell array 66 of the present invention, within a (e.g., 16×16) search area sub-block 228, the Q×Q pixel sub-matchblock 226 can be duplicated as each sub-matchblock 226 is of size 4×4. This duplication can be repeated 16 times over the search area sub-blocks 228. Each of the 16 sub-matchblocks 226 can then be searched in parallel using reduced size (e.g., 7×7) sub-search areas 230. Also in substep 116, the $Q^2$ size reference area is loaded into cell array 66. By way of example, the search is performed on a 4×4 sub-matchblock 226 in a 19×19 area, which is selected as a reasonably large sub-search area. Accordingly, a total of 16×16 matches are needed. Amongst the 16 sub-matchblocks 226, each being of 4×4 pixels, for each sub-matchblock 226, only (16×16)/16=16=4×4 matches are needed. For a Q×Q=4×4 sub-matchblock in a 4×4 search, the search area will be 7×7. For B-type frames, the search area 222 is typically 73×73 pixels for previous and post reference frames, while with P-type frames, the search area is typically 153×73 pixels for left and right parts of the reference frame.

In order to use the previous frame to predict the pixel values in the current frame being encoded, a calculation of the partial sum of the absolute distance Psad (or SAD) is undertaken as follows. For each identical $Q^2$ size sub-matchblock 226, the Psad is determined 118, as defined by Eq. (1), wherein $match_{i,j}$ represents the location of a pixel in the matchblock 226, and $ref_{i,j}$ represents a location of a pixel in the reference area. As part of substep 118, the partial results (of the SAD of all 4 pairs of pixels in one row) is collected and transferred to the end column processor 74 as part of the motion search. In the particular embodiment, a total of 16 output wires are used.

$$Psad_{i,j} = \sum_{i,j=0 \ldots 3} |match_{i,j} - ref_{i,j}|; \quad (1)$$

One manner of implementing this transfer is with a calling procedure to the RISC CPU 18 coordinated by controller 20. Thereafter, substep 120 is undertaken to move the reference sub-search area 230 so that continuing SAD calculations can be performed as part of the exhaustive search in the $Q^2$ size level search. Once these steps are performed, the best match preliminary motion vector $mv_{Q \times Q}$ 232 can be found 122 relative to the center 234 of the search area 222, indicating how many pixels in the y direction and how many pixels in the x direction is the best match displaced in the next picture relative to the reference picture. The sub-process described by substeps 112–122 effectively reduces the size of all frames (current and reference), as well as the matchblock and the search area by a quarter of the size of the original frame, i.e., from 16×16 to 4×4. As will be understood, an exhaustive search is still undertaken, but the calculations rapidly decreases. For example, for each sub-matchblock 226 and search area sub-block 228, the calculation is 16, and no longer 256. Because the matchblock is 1/16th the size of the original picture, and because the search range is 1/16th of the original size, the overall calculation is reduced by 1/56th of the original motion vector calculation. The resulting preliminary motion vector $mv_{Q \times Q}$ 232 determined relative to the center 234 of search area 222, however, will typically need further refinement. For discussion purposes, we will assume a $mv_{Q \times Q}$ of (4, 8) has been determined using the $Q^2$ search.

Figure 10B:
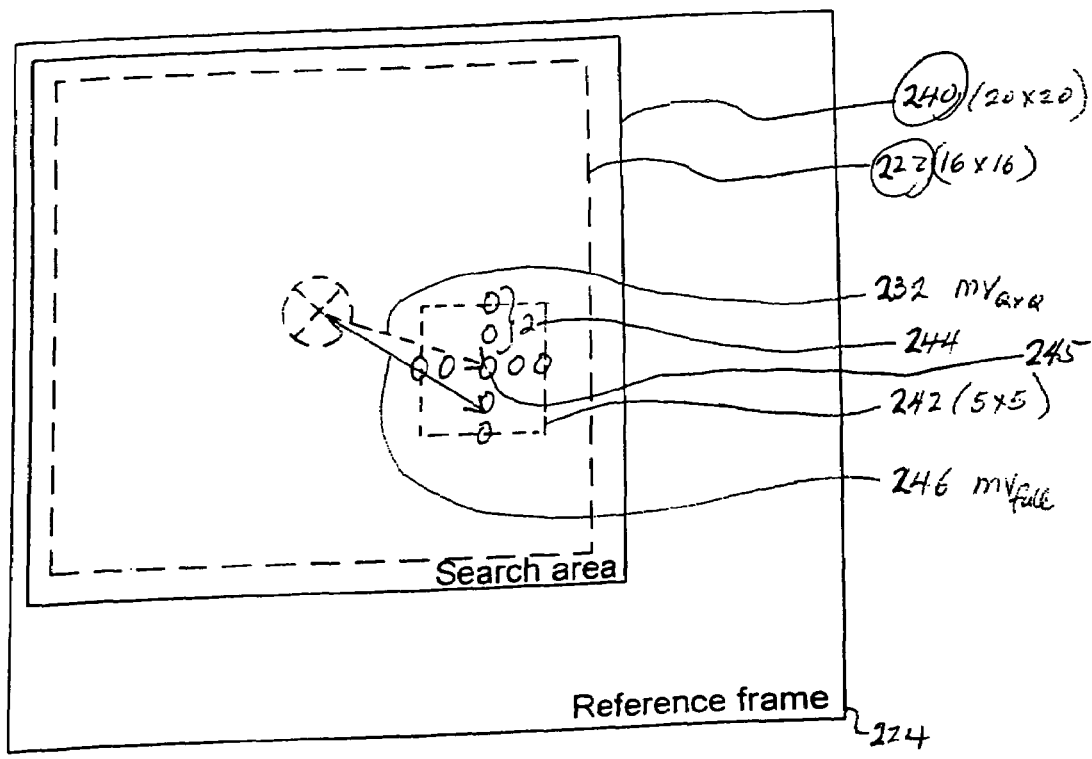
FIG. 10B is an illustration of a refined search block for performing full pixel level searching in accordance with the present invention.
Figure 10C:
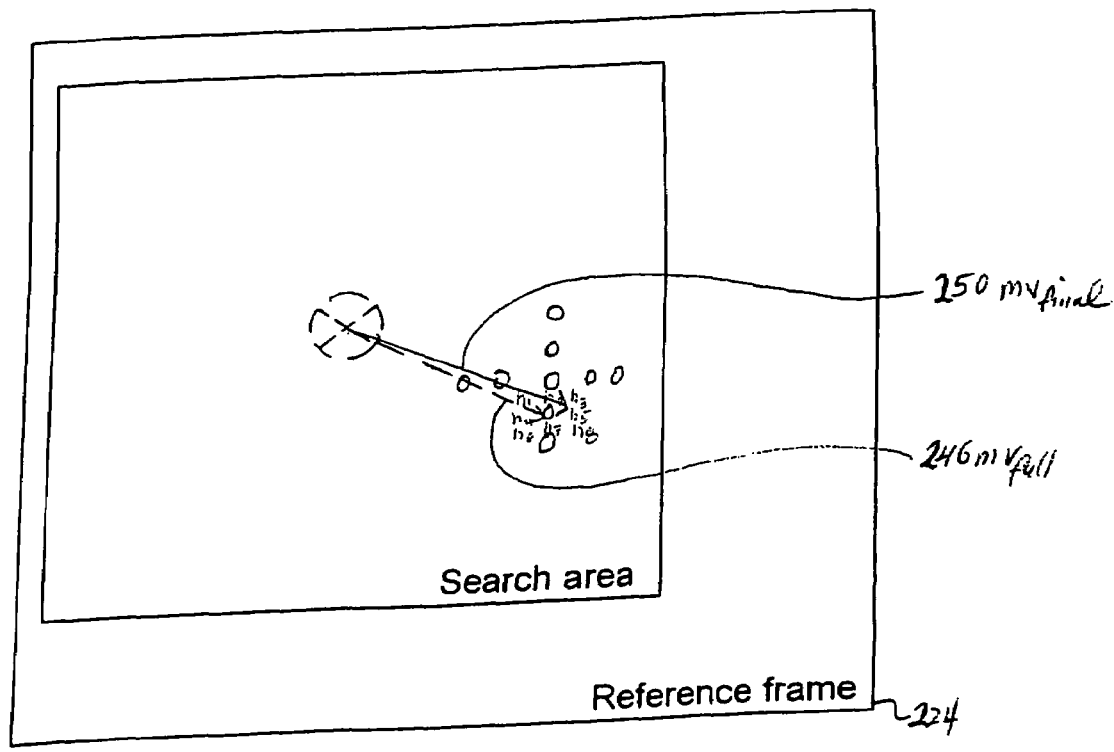
FIG. 10C is an illustration of a further refined search block for performing fractional pixel level searching in accordance with the present invention.

To obtain further precision of the motion vector, the MEC process 100 undertakes a full pixel level search 104 for determining an intermediate motion vector $mv_{full}$. Still referring to FIG. 7, step 104 includes a substep 124, wherein the full size (16×16) matchblock data as well as the current frame are loaded into cell array 66. Those skilled in the art will understand that as a point of reference, the motion vector is obtained by subtracting the location of the upper-left corner or the block being encoded from the location of the upper-left corner of the block in the search are that is the best match. Because a preliminary motion vector, $mv_{Q \times Q}$ 232, has been already determined, a search in the entire reference area is unnecessary. Rather, a search can be performed within a small area around the preliminary motion vector, $mv_{Q \times Q}$ 232. Accordingly and as shown in FIG. 10C, a refined reference search area 240 is determined and loaded 126 in cell array 66. To determine the refined search area 240, an additional search range (e.g., ±2) is selected to increase the search area 222 from a 16×16 block to a 20×20 block. The refined search area 240 is loaded in cell array 66. A refinement range of ±2 can be selected based on the $Q^2$ size search because the search space and the match space were sub-sampled into a 4×4 block from a 16×16 block. The resulting $mv_{Q \times Q}$ 232 actually represents a granularity of 4 pixel positions in the 16×16 dimension block 222, since in order to perform the $Q^2$ search, a block of 4×4=16 pixels were sub-sampled into 1 pixel. So when a motion vector $mv_{Q \times Q}$ 232 is found relative to the $Q^2$ search, the corresponding vector in the M×M dimension block actually lies within 4 possible pixels of the $mv_{Q \times Q}$. The algorithm of the present invention presupposes that each pixels in the Q×Q search stands for 4 pixels in the M×M dimension, and that the $mv_{Q \times Q}$ 232 is in the center of the block, so a ±2 addition to the search range is a refinement of the granularity. For example, the preliminary motion vector $mv_{Q \times Q}$, (4,8), in the previous example, translates to (16, 32), and can be refined as (16±2, 32±2)=(20,36). In order to use the previous frame to predict the pixel values in the current frame being encoded, a calculation of the SAD 128 is undertaken as described with Eq. (2) to determine whether the match is acceptable. As part of substep 128, the partial result (i.e., the SAD of all 16 pairs of pixels in one row) is collected and transferred to the end column processor 74. In the particular embodiment, a total of 20 output wires are used.

$$Psad_{i,j} = \sum_{i,j=0 \ldots 15} |match_{i,j} - ref_{i,j}|; \qquad (2)$$

One manner of implementing this transfer is with a calling procedure to the RISC CPU 18 coordinated by controller 20. Thereafter, substep 130 is undertaken to move the matchblock relative to the refined search area 240 and so that continuing SAD calculations can be performed as part of the exhaustive search in the full size (20×20) level search. In FIG. 10B, a distance 244 of ±2 around the pixel location 245 indicated by $mv_{Q \times Q}$ 232 is a 5×5 pixel sub-array 242. Accordingly, a total computation of 5×5=25 matches are undertaken, where each match has 16×16=256 calculations performed as part of the exhaustive search. Once these steps are performed, the best match intermediate motion vector $mv_{full}$ 246 can be found indicating how many pixels in the y direction and how many pixels in the x direction is the best match displaced in the current picture relative to the reference_picture. It will become apparent to those skilled in the art that with the substeps 124–132, the full size search attempts to improve the motion estimation of step 102, that is, by determining a full pixel level motion vector, $mv_{full}$ 246, which is a refinement of the $mv_{Q \times Q}$ 232. By way of example, the preliminary motion vector $mv_{Q \times Q}$=(4, 8) might be further refined to (5,6) with step 104.

With the above steps 102 and 104, one object of the present invention is to reduce the number of calculations involved in processing the motion vector data. As it will be evident from the description above, the $Q^2$ search reduces the motion estimation process by 1/56th, while the full size search further reduces the search to a small range around the preliminary motion vector. It will be understood that at each level of the motion estimation calculation from steps 102 and 104, the number of calculations conventionally associated with motion estimation is reduced, as is the complexity of calculations typically required.

For example, referring to FIG. 10A, for one sub-matchblock 226 in a search area sub-block 228, there is a 4:1 sub-sampled representation. Because such search area sub-block 228 is a 16×16 pixel area in which to search for sub-matchblock 226, which is 4×4 pixels in size, the exhaustive search for one match involves undertaking 16 comparisons (differences); 16 calculations involving computing the absolute value of the differences; and 15 additions of the 16 values. So, for (16×16=) 256 matches in the search area 222, the total computations involved is 256~16 comparisons +256~16 absolute values +256~15 additions. This is a significant reduction in the number of calculations by comparison to conventional methods of using the matchblock to exhaustively search the entire search area. When the full pixel level search is undertaken to refine the granularity of the preliminary motion vector $mv_{Q \times Q}$ 232, the computation will be based on 25 matches. So, even though there are additional stages associated with refining the motion vector in accordance with the present invention, the overall number of calculations is significantly reduced.

Referring back to FIG. 7, to obtain the prediction data and residual data to be quantized, the MEC process 100 undertakes a fractional pixel level search 106 to further improve the precision of the intermediate motion vector $mv_{full}$ 246. In one embodiment in accordance with the present invention, the fraction utilized corresponds to a half pixel search. With this particular embodiment, the displacement between current and reference frames is measured in half pixels. Pixels of the coded frame being search are interpolated to obtain twice the number of pixels as in the original frame to obtain a double image. This doubled image can then be searched for the best matching block.

At substep 134, the 16×16 matchbock (e.g., macroblock) is located at a point of reference in the current frame, while at substep 136, a refined reference area, based on the result of the full size search, is located at a point of reference and calibrated with the point of reference for the macroblock. The half pixel calculation is then determined 138.

Figure 8:
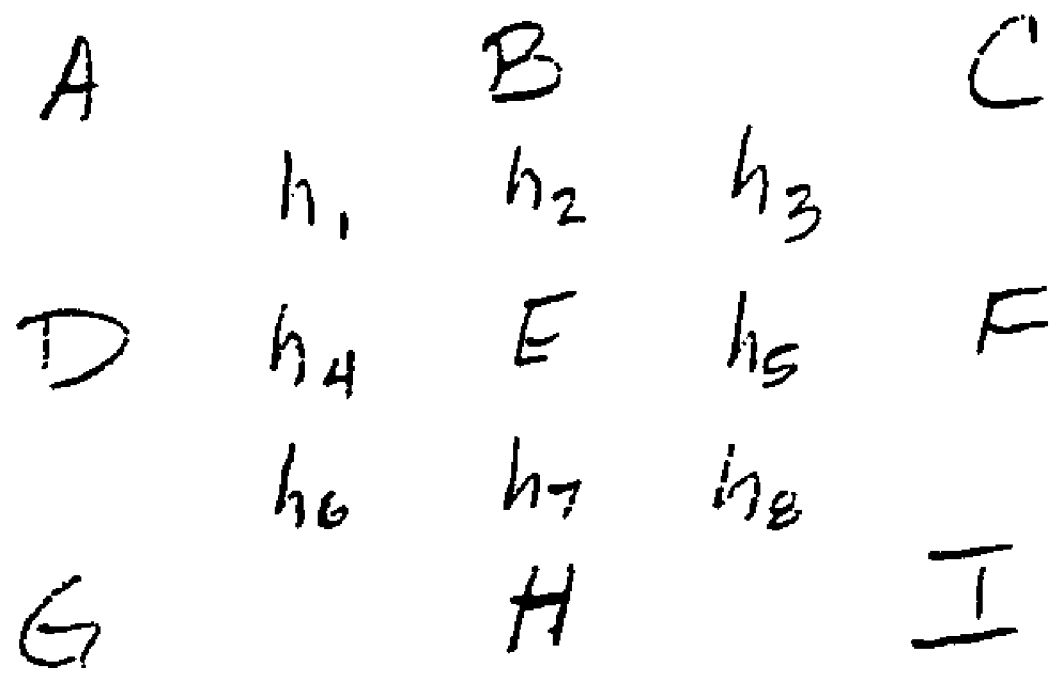

Referring now to the image in FIG. 8, the half pixel calculation will now be described. In FIG. 8, A, B, C, D, E, F, G, H and I represent the pixels of the image in the original frame. The half-pixels h1, h2, h3, h4, h5, h6, h7 and h8 may be determined by interpolating adjacent original pixels by the following equations. The half pixels of Equations (3) through (6) are determined by interpolating between adjacent two neighboring pixels, while the half pixels of Equations (7) through (10) are determined from the average of the four neighboring pixels. It will be understood by those skilled in the art that if the results of Eq.s (3) through (10) are not desired in a floating point data form then a value of 0.5 may be added to each of these equations to provide a rounded final value.

$$h_2 = (B+E)/2 \qquad (3)$$

$$h_4 = (D+E)/2 \qquad (4)$$

$$h_5 = (E+F)/2 \qquad (5)$$

$$h_7 = (E+H)/2 \qquad (6)$$

$$h_1 = (A+B+D+E)/4 \qquad (7)$$

$$h_3 = (B+C+E+F)/4 \qquad (8)$$

$$h_6 = (D+E+G+H)/4 \qquad (9)$$

$$h_8 = (E+F+H+I)/4 \qquad (10)$$

In order to complete step 138, a half-pixel predicted reference macroblock $pred_{i,j}$ is determined according to Eq. (11).

$pred_{i,j}=$ $(ref_{i,j}+ref_{i,j-1}+1)>>1$; or $(ref_{i,j}+ref_{i,j+1}+1)>>1$; or $(ref_{i,j}+ref_{i-1,j}+1)>>1$; or $(ref_{i,j}+ref_{i+1,j}+1)>>1$; or $(ref_{i,j}+ref_{i,j-1}+ref_{i-1,j}+ref_{i-1,j-1}+2)>>2$; or $(ref_{i,j}+ref_{i,j-1}+ref_{i-1,j}+ref_{i+1,j-1}+2)>>2$; or $(ref_{i,j}+ref_{i,j+1}+ref_{i+1,j}+ref_{i+1,j+1}+2)>>2$; or $(ref_{i,j}+ref_{i,j+1}+ref_{i-1,j}+ref_{i-1,j+1}+2)>>2 \qquad (11)$ In order to use the previous frame to predict the pixel values in the current frame being encoded, a calculation of the partial SAD 140 is undertaken according to Eq. (12) to determine whether the match is acceptable. As part of substep 140, the partial result (i.e., the SAD of all 16 pairs of pixels in one row) is collected and transferred to the end column processor 74. In the particular embodiment, a total of 20 output wires are used.

$$Psad_{i,j} = \sum_{i,j=0 \ldots 15} |match_{i,j} - pred_{i,j}| \tag{12}$$

Thereafter, substep 142 is undertaken to move the matchblock so that continuing the calculation of prediction data pred $_{i,j}$ and SAD can be performed for the half-pixel search on all 8 of the positions, h1, h2, h3, h4, h5, h6, h7 and h8, since there are 8 half pixel possible predictions around a pixel. FIG. 10C illustrates the effect of these calculations to improve the granularity of the intermediate motion vector mv$_{full\ 246}$ to mv$_{final\ 250}$. By way of example, the preliminary motion vector mv$_{QxQ}$=(4, 8) that was refined to (5,6), can be further refined to create the prediction data (5, 6.5).

One aspect of the present invention is to reduce the number of motion estimation calculations while keeping a high quality of the resulting predictions. In addition to decreasing the number of calculations for motion estimation as already described, the present invention improves motion estimation processing by incrementally improving the resolution of the motion vector from the three stages involving partial pixel level search, full pixel level search and the half pixel search. Additionally, with the half pixel level search, no more new data need be loaded from DRAM 22 into the MEC array 66 because the necessary data was already loaded during full size search step 104. For example, even though the full size search required a 20×20 block, the array 66 can accommodate 22×22 blocks, thereby storing other image data in the various boundary cells for use in the half pixel search stage.

The process 100 continues with the YUV estimation step 108. This subprocess comprises locating the matchblock and reference block in the SRAM 60, and loading them from the stream buffer 40 into the MEC array 66 in order to facilitate U (8×8) and V (8×8) estimation. It will be understood by those skilled in the art of video processing, that the step of loading data into the array 66 includes placing the image in the array at a point of reference, e.g., either to the right or in a vertically centered position. The matchblock match$_{i,j}$ and reference block for the luminance, Y, has already been loaded into the array during the full size search. With the prediction data, pred$_{i,j}$, determined from the half pixel search, the predicted data of the reference (16×16) matchblock can be computed using Eq. (13).

pred$_{i,j}$= ref$_{i,j}$; or (ref$_{i,j}$+ref$_{i,j-1}$+1)>>1; or (ref$_{i,j}$+ref$_{i,j+1}$+1)>>1; or (ref$_{i,j}$+ref$_{i-1,j}$+1)>>1; or (ref$_{i,j}$+ref$_{i+1,j}$+1)>>1; or (ref$_{i,j}$+ref$_{i,j-1}$+ref$_{i-1,j}$+ref$_{i-1,j-1}$+2)>>2; or (ref$_{i,j}$+ref$_{i,j-1}$+ref$_{i+1,j}$+ref$_{i+1,j-1}$+2)>>2; or (ref$_{i,j}$+ref$_{i,j+1}$+ref$_{i+1,j}$+ref$_{i+1,j+1}$+2)>>2

(ref$_{i,j}$+ref$_{i,j+1}$+ref$_{i-1,j}$+ref$_{i-1,j+1}$+2)>>2 (13)

The residual data, residue $_{i,j}$, of the macroblock can then be determined from Eq. (14).

$$residue_{i,j} = match_{i,j} - pred_{i,j} \tag{14}$$
$$i,j=0 \ldots 15$$

The prediction macroblock, pred$_{i,j}$, and the residue macroblock, residue$_{i,j}$, may be output to stream buffer 40 through the io cells 88, and over data lines 69.

In general, once the residue and prediction data are determined for a macroblock, such information is typically stored (e.g., WRITE) to the memory device 22, so that the previously described process can be performed on the next macroblock. After several macroblocks have been processed in this manner or periodically, data is received from the IDCT 42 by the MEC array 66 so that decompensation (step 110) can be performed to reconstruct the video stream that will be coded. To perform decompensation, the residue data residue $_{i,j}$ and prediction data pred$_{i,j}$ of the Y (16×16), U (8×8) and V (8×8) components are located in memory and reloaded into the array 66. Reconstruction of the macroblock data can be implemented using Eq. (15).

$$reconstructed_{i,j} = residue_{i,j} - pred_{i,j} \tag{15}$$
$$i,j=0 \ldots 15$$

The reconstructed macroblock, reconstructed$_{i,j}$, can be output to the stream buffer 40 through the io cells 88, and over data lines 69.

With the present invention, real time encoding can be implemented at 20×480×30 frames per second, by way of example. However, even though the MEC array 66 of FIG. 3 has been described with respect to the specific architecture of system 10 in FIG. 2, it will be appreciated that MEC array 66 may work suitably well with other architectures of video compression systems. For example, the MEC engine 38 can be used as an MPEG codec. Further, the MEC array 66 has a wider application than the motion estimation techniques described herein. Similarly, MEC array 66 is not limited to only performing the sequence of steps described in FIGS. 6–7 with regard to motion estimation. Those skilled in the art will understand that the MEC array 66 may operate suitably well with other sequences of steps and functions to provide video compression.

After reviewing this disclosure, those skilled in the art will recognize that the present invention applies not only to motion vectors determined according to the pixel-by-pixel technique described above, but may be extended to motion vectors found with other schemes. Furthermore, it will be appreciated by those of ordinary skill in the art that the present invention may be practiced in a variety of ways and is applicable to video standards following ISO MPEG, MPEG-1, MPEG-2, MPEG-4, H.261, H.263, H.323 standards, as well as the ITU-Telecom H.262.

Although the invention has been described in considerable detail with reference to certain embodiments, other embodiments are possible. As will be understood by those of skill in the art, the invention may be embodied in other specific forms without departing from the essential characteristics thereof. Accordingly, the present invention is intended to embrace all such alternatives, modifications and variations as fall within the spirit and scope of the appended claims and equivalents.

What is claimed is:

1. A method of motion estimation and compensation processing, comprising:

determining a preliminary motion vector from a set of partial motion vectors each associated with a corresponding subsampled matchblock representing a given picture;

generating a second motion vector based on a refined granularity of the preliminary motion vector; and performing a fractional pixel search using the second motion vector to produce a final motion vector, the final motion vector being used for motion compensation.

2. The method of motion estimation and compensation processing according to claim 1, wherein determining a preliminary motion vector, comprises:

dividing the matchblock associated with the given picture into a plurality of first sub-blocks;

dividing a search area associated with a reference picture into a plurality of second sub-blocks, the second sub-blocks being divided by a factor similar to that used to divide the first sub-blocks;

duplicating one of the first sub-blocks over each of the second sub-blocks; and determining a set of best matches between a respective sub-image in each of the first sub-blocks and a sub-image in each corresponding one of the second sub-blocks, the set of best matches representing the set of partial motion vectors.

3. The method of motion estimation and compensation processing according to claim 2, wherein the first sub-blocks each comprises a Q×Q array of pixels subsampled from the matchblock, and the second sub-blocks each comprises an M×M array of pixels.

4. The method of motion estimation and compensation processing according to claim 3, wherein M=16 and Q=4.

5. The method of motion estimation and compensation processing according to claim 3, wherein Q=19 for bidirectionally predicted coded (P-type) pictures that are in sequence previous to and subsequent to the reference picture.

6. The method of motion estimation and compensation processing according to claim 3, wherein Q=19 for left and right portions of the given picture, when in a predicted coded (P-type) format.

7. The method of motion estimation and compensation processing according to claim 2, wherein determining a set of best matches comprises:

performing exhaustive searches in parallel for each of the first sub-blocks over each respect one of the second sub-blocks.

8. The method of motion estimation and compensation processing according to claim 7, wherein performing exhaustive searches in parallel comprises:

calculating a partial sum of absolute distance (Psad) between coordinate positions of one first sub-block and a corresponding one of the second sub-blocks.

9. The method of motion estimation and compensation processing according to claim 8, wherein the Psad is determined from $$Psad_{i,j} = \sum_{i,j=0..3} |match_{i,j} - ref_{i,j}|,$$

wherein i represents an x coordinate position, j represents a y coordinate position, $match_{i,j}$ represents a first sub-block, and $ref_{i,j}$ represents a second sub-block.

10. The method of motion estimation and compensation processing according to claim 7, wherein performing exhaustive searches in parallel comprises:

contemporaneously moving each of the second sub-blocks relative to each corresponding first sub-block to a next location; and calculating a partial sum of absolute distance (Psad) between coordinate positions of one first sub-block and a corresponding one of the second sub-blocks.

11. The method of motion estimation and compensation processing according to claim 1, wherein generating a second motion vector based on a refined granularity of the preliminary motion vector, comprises:

obtaining the matchblock associated with the given picture;

enlarging a first search area to generate a second search area, the first search area being associated with a reference picture and used to determine the set of partial motion vectors; and determining a best match between a respective sub-image located in the matchblock and a sub-image that is identical to the respective sub-image and that is located in the second search area, the best match representing the second motion vector.

12. The method of motion estimation and compensation processing according to claim 11, wherein determining a best match comprises:

performing an exhaustive search for the respective sub-image over the second search area.

13. The method of motion estimation and compensation processing according to claim 12, wherein performing an exhaustive search, comprises:

calculating a partial sum of absolute distance (Psad) between a coordinate position associated with the matchblock and a corresponding coordinate position associated with the second search area.

14. The method of motion estimation and compensation processing according to claim 13, wherein the Psad is determined from $$Psad_{i,j} = \sum_{i,j=0..3} |match_{i,j} - ref_{i,j}|,$$

wherein i represents an x coordinate position, j represents a y coordinate position, $match_{i,j}$ represents the matchblock, and $ref_{i,j}$ represents the second search area.

15. The method of motion estimation and compensation processing according to claim 13, wherein performing an exhaustive search, comprises:

for each coordinate position associated with the matchblock, calculating a partial sum of absolute distance (Psad) between each said coordinate position and all coordinate positions associated with the second search area.

16. The method of motion estimation and compensation processing according to claim 11, wherein the matchblock comprises an M×M array of pixels, the first search area comprises a Q×Q array of pixels, and the second search area comprises an Q±2×Q±2 array of pixels, where Q α M/4.

17. The method of motion estimation and compensation processing according to claim 16, wherein M=16 and Q=4.

18. The method of motion estimation and compensation processing according to claim 1, wherein performing a fractional pixel search using the second motion vector to produce a final motion vector, comprises:
   obtaining the matchblock associated with the given picture; enlarging a first search area to generate a second search area, the first search area being associated with a reference picture and used to determine the second motion vector;
   determining a half-pixel predicted reference macroblock associated with the second search area; and
   determining a best match between a respective sub-image located in the matchblock and a sub-image that is identical to the respective sub-image and that is located in the second search area, the best match representing the second motion vector.

19. The method of motion estimation and compensation processing according to claim 18, wherein determining a best match comprises:
   performing an exhaustive search for the respective sub-image over the second search area.

20. The method of motion estimation and compensation processing according to claim 19, wherein performing an exhaustive search, comprises:
   calculating a partial sum of absolute distance (Psad) between a coordinate position associated with the macroblock and a corresponding coordinate position associated with the second search area.

21. The method of motion estimation and compensation processing according to claim 20, wherein the Psad is determined from $$Psad_{i,j} = \sum_{i,j=0 \ldots 3} |match_{i,j} - ref_{i,j}|,$$

wherein i represents an x coordinate position, j represents a y coordinate position, $match_{i,j}$ represents the matchblock, and $ref_{i,j}$ represents the second search area.

22. The method of motion estimation and compensation processing according to claim 19, wherein performing an exhaustive search, comprises:
   for each coordinate position associated with the macroblock, calculating a partial sum of absolute distance (Psad) between each said coordinate position and all coordinate positions associated with the second search area.

23. The method of motion estimation and compensation processing according to claim 18, wherein the matchblock comprises a 16×16 array of pixels, the first search area comprises a 4×4 array of pixels, and the second search area comprises a 18×18 array of pixels.

24. The method of motion estimation and compensation processing according to claim 1, further comprising:
   determining residual data associated with the final motion vector; and
   reconstructing a video signal for encoding based on the residual data and the final motion vector.

25. The method of motion estimation and compensation processing according to claim 24, wherein determining residual data (residues) associated with the final motion vector, comprises:
   determining match data ($match_{ij}$) for Y, U, and V components of the given picture; and
   calculating prediction data ($pred_{i,j}$) of a reference macroblock ($ref_{i,j}$) associated with a half pixel search.

26. The method of motion estimation and compensation processing according to claim 25, wherein the $pred_{i,j}$ is determined according to $pred_{i,j}=$ $(ref_{i,j}+ref_{i,j-1}+1)>>1$; or $(ref_{i,j}+ref_{i,j+1}+1)>>1$; or $(ref_{i,j}+ref_{i-1,j}+1)>>1$; or $(ref_{i,j}+ref_{i+1,j}+1)>>1$; or $(ref_{i,j}+ref_{i,j-1}+ref_{i-1,j}+ref_{i-1,j-1}+2)>>2$; or $(ref_{i,j}+ref_{i,j-1}+ref_{i+1,j}+ref_{i+1,j-1}+2)>>2$; or $(ref_{i,j}+ref_{i,j+1}+ref_{i+1,j}+ref_{i+1,j+1}+2)>>2$; or $(ref_{i,j}+ref_{i,j+1}+ref_{i-1,j}+ref_{i-1,j+1}+2)>>2,$ wherein i represents an x coordinate position and j represents a y coordinate position of the reference macroblock.

27. The method of motion estimation and compensation processing according to claim 26, wherein the residual data is determined by $$residue_{i,j} = match_{i,j} - pred_{i,j}.$$
$$i,j=0 \ldots 15$$

28. The method of motion estimation and compensation processing according to claim 27, wherein reconstructing a video signal for encoding based on the residual data and the final motion vector, comprises reconstructing the macroblock data according to $$reconstructed_{i,j} = residue_{i,j} - pred_{i,j}.$$
$$i,j=0 \ldots 15$$

29. The method of motion estimation and compensation processing according to claim 27, wherein reconstructing a video signal for encoding based on the residual data and the final motion vector, comprises performing decompensation to reconstruct the macroblock data based on the residue data and the prediction data.

30. A computer-implemented method of motion estimation processing, comprising:
   dividing a matchblock of a current frame into a plurality of sub-matchblocks, the current frame to be encoded;
   dividing a first search area of a reference frame into a plurality of search sub-blocks;
   replicating a sub-matchblock over each of the search sub-blocks;
   performing partial pixel level searching in parallel of each sub-matchblock replicated over the search sub-blocks to generate a preliminary motion vector;
   modifying the first search area to produce a second search area;
   performing full pixel level searching of the matchblock over the second search area to generate a second motion vector, the second motion vector being of finer granularity than the preliminary motion vector; and
   performing half pixel searching on the second motion vector to produce a final motion vector used for motion compensation.

31. The computer-implemented method of motion estimation processing according to claim 30, further comprising:
   determining residual data and prediction data associated with the final motion vector; and
   reconstructing a video signal for encoding based on the residual data and the prediction data.

32. A video compression system, comprising:
   a processor-based platform coupled to a bus subsystem; and
   coupled to said bus subsystem, a front end subsystem having at least a motion estimation and compensation (MEC) engine coupled to a stream buffer, wherein said MEC engine comprises a controller configured to:
   determine a preliminary motion vector from a set of partial motion vectors, each associated with a corresponding subsampled matchblock representing a given picture;
   generate a second motion vector based on a refined granularity of said preliminary motion vector; and
   perform a fractional pixel search using said second motion vector to produce a final motion vector said final motion vector being used for motion compensation.

33. The video compression system according to claim 32, wherein the MEC engine includes:
   an A×B array formed from a plurality of cells coupled to a set of controllers and an end column processor.

34. The video compression system according to claim 33, wherein the A×B array includes:
   a M×N sub-array of p_cells; and
   coupled to the p_cells, a plurality of boundary cells bounding the M×N sub-array.

35. The video compression system according to claim 34, wherein the boundary cells include:
   a plurality of updown cells disposed along a first set of opposing sides of the M×N sub-array of p_cells;
   a plurality of io cells facing a plurality of column cells, the io cells disposed along one side of a second set of opposing sides of the M×N sub-array of p_cells, and the column cells disposed along the other side of the second set of opposing sides of the M×N sub-array of p_cells; and
   a plurality of corner cells coupled to the updown cells.

36. The video compression system according to claim 35, wherein N=5, and M=20, A=7, and B=22.

37. The video compression system according to claim 33, wherein the set of controllers includes an x-controller and a y-controller each having respective control lines coupled to the MEC array to form an MIMD arrangement.

38. The video compression system according to claim 33, wherein the end column processor receives output signals from the MEC array.

39. The video compression system according to claim 32, wherein said system is included in one of a PC camera, digital camera, personal digital assistant (PDA), multimedia cellular mobile phone, digital video recorder (DVR), and multimedia device and appliance.

40. The video compression system according to claim 32, wherein said system is included in one of an SoC and an ASIC applications.

41. A computer program product for motion estimation and compensation, the computer program product stored on a computer readable medium, and adapted to perform operations of:
   determining a preliminary motion vector from a set of partial motion vectors each associated with a corresponding subsampled matchblock representing a given picture;
   generating a second motion vector based on a refined granularity of the preliminary motion vector; and
   performing a fractional pixel search using the second motion vector to produce a final motion vector, the final motion vector being used for motion compensation.

42. A computer program product for video compression processing, the computer program product stored on a computer readable medium, and adapted to perform operations of:
   dividing a matchblock of a current frame into a plurality of sub-matchblocks, the current frame to be encoded;
   dividing a first search area of a reference frame into a plurality of search sub-blocks;
   replicating a sub-matchblock over each of the search sub-blocks;
   performing partial pixel level searching in parallel of the sub-matchblocks replicated over the search sub-blocks to generate a preliminary motion vector;
   modifying the first search area to produce a second search area;
   performing full pixel level searching of the matchblock over the second search area to generate a second motion vector, the second motion vector being of finer granularity than the preliminary motion vector; and
   performing half pixel searching on the second motion vector to produce a final motion vector used for motion compensation.

43. A video processing system providing motion compensation, comprising:
   means for determining a preliminary motion vector from a set of partial motion vectors each associated with a corresponding subsampled matchblock representing a given picture;
   coupled to the means for determining, means for generating a second motion vector based on a refined granularity of the preliminary motion vector; and
   coupled to the means for generating, means for performing a fractional pixel search using the second motion vector to produce a final motion vector, the final motion vector being used for motion compensation.

44. The video processing system according to claim 43, wherein the means for determining a preliminary motion vector, comprises:
   means for dividing the matchblock associated with the given picture into a plurality of first sub-blocks;
   means for dividing a search area associated with a reference picture into a plurality of second sub-blocks, the second sub-blocks being divided by a factor similar to that used to divide the first sub-blocks;
   means for duplicating one of the first sub-blocks over each of the second sub-blocks; and
   means for determining a set of best matches between a respective sub-image in each of the first sub-blocks and a sub-image in each corresponding one of the second sub-blocks, the set of best matches representing the set of partial motion vectors.

45. The video processing system according to claim 43, wherein the means for generating a second motion vector based on a refined granularity of the preliminary motion vector, comprises:

means for obtaining the matchblock associated with the given picture;

means for enlarging a first search area to generate a second search area, the first search area being associated with a reference picture and used to determine the set of partial motion vectors; and means for determining a best match between a respective sub-image located in the matchblock and a sub-image that is identical to the respective sub-image and that is located in the second search area, the best match representing the second motion vector.

46. The video processing system according to claim 43, wherein the means for performing a fractional pixel search using the second motion vector to produce a final motion vector, comprises:

means for obtaining the matchblock associated with the given picture;

means for enlarging a first search area to generate a second search area, the first search area being associated with a reference picture and used to determine the second motion vector;

means for determining a half-pixel predicted reference macroblock associated with the second search area; and means for determining a best match between a respective sub-image located in the matchblock and a sub-image that is identical to the respective sub-image and that is located in the second search area, the best match representing the second motion vector.

* * * * *

UNITED STATES PATENT AND TRADEMARK OFFICE
CERTIFICATE OF CORRECTION

PATENT NO. : 6,970,509 B2
DATED : November 29, 2005
INVENTOR(S) : Shuhua Xiang, Li Sha and Yaojun Luo It is certified that error appears in the above-identified patent and that said Letters Patent is hereby corrected as shown below:

Column 23,
Lines 64-65, replace "$Psad_{i,j} = \sum_{i,j=0..3} |match_{i,j} - ref_{i,j}|$,"

with $-- Psad_{i,j} = \sum_{i,j=0..3} |match_{i,j} - ref_{i,j}|, --$.

Column 25,
Line 63, replace "(residues)" with -- (residue$_{ij}$) --.

Signed and Sealed this

Fourteenth Day of March, 2006

JON W. DUDAS
*Director of the United States Patent and Trademark Office*